United States Patent
Negishi et al.

(10) Patent No.: US 11,590,918 B2
(45) Date of Patent: Feb. 28, 2023

(54) SIDE AIRBAG DEVICE

(71) Applicant: TS TECH CO., LTD., Saitama (JP)

(72) Inventors: Hirooki Negishi, Tochigi (JP);
Masayuki Miyazaki, Tochigi (JP);
Naoya Nishimoto, Tochigi (JP);
Kazuaki Mima, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/738,077

(22) Filed: May 6, 2022

(65) Prior Publication Data

US 2022/0258688 A1 Aug. 18, 2022

Related U.S. Application Data

(63) Continuation of application No. 16/977,658, filed as application No. PCT/JP2019/010103 on Mar. 12, 2019, now Pat. No. 11,325,553.

(30) Foreign Application Priority Data

Mar. 13, 2018 (JP) .............................. JP2018-045811
Mar. 13, 2018 (JP) .............................. JP2018-045812

(51) Int. Cl.
*B60R 21/207* (2006.01)
*B60R 21/217* (2011.01)
*B60R 21/16* (2006.01)

(52) U.S. Cl.
CPC .......... *B60R 21/207* (2013.01); *B60R 21/217* (2013.01); *B60R 2021/161* (2013.01)

(58) Field of Classification Search
CPC ................ B60R 21/207; B60R 21/217; B60R 2021/161; B60R 2021/2078
See application file for complete search history.

(56) References Cited

U.S. PATENT DOCUMENTS 5,967,547 A    10/1999    Narita et al.
6,357,789 B1    3/2002    Harada et al.
(Continued)

FOREIGN PATENT DOCUMENTS

JP    H04-48049 U    4/1992
JP    2000-085518 A    3/2000
(Continued)

OTHER PUBLICATIONS

International Search Report dated Jun. 18, 2019 for the corresponding PCT Application No. PCT/JP2019/010103, with English machine translation.

(Continued)

*Primary Examiner* — Darlene P Condra
(74) *Attorney, Agent, or Firm* — Michael Best & Friedrich LLP

(57) ABSTRACT

A side airbag device capable of preventing interference between a harness and an airbag is provided between a vehicle body and a seat. The side airbag device includes an airbag module including an inflatable airbag and an inflator supplying a gas into the airbag, a base member including an airbag storage portion having a concave shape and storing the airbag module and is attached between a vehicle body door and the seat, and a retainer member holding the airbag storage portion from the rear side of the vehicle body. The base member includes a first through hole through which a harness of the inflator is inserted and a flange which is formed in the periphery of the first through hole. The retainer member includes a second through hole through which the harness of the inflator is inserted and which is provided at a position facing the first through hole.

8 Claims, 18 Drawing Sheets

(56) References Cited

U.S. PATENT DOCUMENTS

| | | |
|---|---|---|
| 6,439,597 B1 | 8/2002 | Harada et al. |
| 6,705,671 B1 | 3/2004 | Glovatsky et al. |
| 2002/0190509 A1 | 12/2002 | Higashi |
| 2006/0061073 A1 | 3/2006 | Naruse et al. |
| 2007/0216140 A1 | 9/2007 | Yoshikawa et al. |
| 2012/0313353 A1 | 12/2012 | Shankar |
| 2013/0175792 A1 | 7/2013 | Fukawatase et al. |
| 2015/0291072 A1 | 10/2015 | Ito |
| 2015/0336528 A1* | 11/2015 | Tanabe .................. B60N 2/5841 280/728.2 |
| 2016/0009248 A1 | 1/2016 | Tanabe et al. |
| 2016/0159305 A1 | 6/2016 | Makita |
| 2017/0021793 A1 | 1/2017 | Ito et al. |
| 2017/0158156 A1 | 6/2017 | Shimizu et al. |
| 2017/0174169 A1 | 6/2017 | Tanabe et al. |
| 2018/0001859 A1 | 1/2018 | Tanabe et al. |
| 2018/0001860 A1 | 1/2018 | Tanabe et al. |
| 2018/0001861 A1 | 1/2018 | Tanabe et al. |
| 2018/0222427 A1 | 8/2018 | Tanabe et al. |
| 2019/0202390 A1* | 7/2019 | Ono ...................... B60R 21/206 |

FOREIGN PATENT DOCUMENTS

| | | |
|---|---|---|
| JP | 2000-289510 A | 10/2000 |
| JP | 2000-313302 A | 11/2000 |
| JP | 2001-301665 A | 10/2001 |
| JP | 2006-088850 A | 4/2006 |
| JP | 2007-245889 A | 9/2007 |
| JP | 2014-100943 A | 6/2014 |
| JP | 2015-020649 A | 2/2015 |
| JP | 2017-024504 A | 2/2017 |
| JP | 2018-027780 A | 2/2018 |
| WO | 2012/035619 A1 | 3/2012 |
| WO | 2016/010011 A1 | 1/2016 |

OTHER PUBLICATIONS

Japanese Office Action dated Feb. 22, 2022, from the Japan Patent Office (JPO) for the related Japanese Patent Application No. 2018-045811, with machine English translation.

* cited by examiner

SIDE AIRBAG DEVICE

CROSS-REFERENCE TO RELATED APPLICATIONS

This application is a continuation of U.S. patent application Ser. No. 16/977,658, filed on Sep. 2, 2020, which, in turn, is a National Stage Entry of PCT Application No. PCT/JP2019/010103, filed on Mar. 12, 2019. Further, this application claims the benefit of priority from Japanese Application Numbers 2018-045811, filed on Mar. 13, 2018, and 2018-045812 filed on Mar. 13, 2018, the entire contents of which are incorporated herein by reference.

TECHNICAL FIELD

The present invention relates to a side airbag device and particularly to a side airbag device provided in a vehicle seat.

BACKGROUND ART

Conventionally, as a side airbag device which is disposed between a vehicle body door and a seat in a vehicle body width direction, one including an inflator which injects a gas into an airbag, a box-shaped storage casing which stores the airbag and the inflator, and a resinous base cover which covers the storage casing from the front side of a vehicle body is known (for example, see Patent Literatures 1 and 2).

Here, in the side airbag device described in Patent Literature 1, when the airbag stored in the storage casing is inflated by the inflator, the airbag breaks a thin portion of the base cover on the front side of the vehicle body and is inflated and deployed.

Specifically, the inflator is connected to a vehicle battery provided on the vehicle body via a harness. When a predetermined amount or more of impact is applied from the side of the vehicle body, igniting electric power is supplied from the vehicle battery to the inflator via the harness and the airbag is inflated and deployed on the lateral side of the occupant.

With the above-described configuration, according to the side airbag device, it is possible to alleviate an impact applied to an occupant sitting on the seat.

CITATION LIST

Patent Literature

PATENT LITERATURE 1: JP 2006-88850 A
PATENT LITERATURE 2: WO 2012/035619 A

SUMMARY OF INVENTION

Technical Problem

Incidentally, in the side airbag device of Patent Literature 1, since the inflator is stored in the storage casing on the rear side of the vehicle body of the base cover, a shape in which the harness extends from the vehicle battery toward the inflator inside the storage casing becomes complex.

For that reason, when the harness was freely moved and rotated due to the vibration applied from the occupant, the vibration of the vehicle body, or the like, there was concern that the harness interfered with the airbag when inflating and deploying the airbag.

Particularly, in the case of the side airbag device disposed in a space between the vehicle body and the rear seat, since an operation in which components were attached in a narrow space was performed, it was necessary to prepare a countermeasure in which the harness was disposed so as to not to interfere with the airbag.

Further, in the vehicle seat according to the above-described related art, the stay cloth bracket for attaching the stay cloth that guides the deployment direction of the airbag is attached to the outside of a base member storing the airbag. In this way, when the stay cloth bracket is attached to the outside of the base member, the side airbag device increases in size.

The present invention has been made in view of the above-described circumstances and an object thereof is to realize a miniaturization of a side airbag device provided between a vehicle body and a seat.

Further, another object of the present invention is to provide a side airbag device capable of preventing interference between a harness and an airbag.

Solution to Problem

The above-described problems are solved by a side airbag device according to the present invention, the side airbag device provided between a vehicle body and a seat including: an airbag module that includes an inflatable airbag and an inflator supplying a gas into the airbag; a base member that includes an airbag storage portion having a concave shape and storing the airbag module, and is attached between a vehicle body door and the seat; and a retainer member that holds the airbag storage portion from the rear side of the vehicle body, in which the base member includes a first through hole through which a harness of the inflator is inserted and a flange which is formed in the periphery of the first through hole, and in which the retainer member includes a second through hole through which the harness of the inflator is inserted and which is provided at a position facing the first through hole.

According to the side airbag device, the harness of the inflator can be passed through the base member and the retainer member without bypassing the outside of the base member and the retainer member. Accordingly, the harness can be disposed so as not to interfere with the airbag.

In the side airbag device, the airbag storage portion may include a bottom portion and a side wall portion which extends forward from the bottom portion and the first through hole may be formed in the bottom portion.

Therefore, since the first through hole is formed in the bottom portion on the rear surface side of the base member, it is possible to prevent a decrease in rigidity of the base member.

In the side airbag device, an inner peripheral surface of the flange may be continuous to the first through hole.

Therefore, it is possible to prevent the harness from contacting the retainer member.

In the side airbag device, the first through hole may be provided above an upper end of the inflator.

Therefore, it is possible to prevent a decrease in rigidity of the airbag storage portion holding the inflator in the base member.

In the side airbag device, the airbag storage portion may include a boss portion which projects backward from the bottom portion and the first through hole may be provided below the boss portion.

Therefore, it is possible to prevent the harness from contacting the boss portion.

In the side airbag device, the retainer member may include a boss portion inserting through hole through which the boss portion is passed.

Therefore, it is easy to position the base member and the retainer member.

In the side airbag device, the first through hole may be formed at a position vertically aligned with the boss portion.

Therefore, it is possible to improve the rigidity of the area including the first through hole in the base member in the up to down direction.

In the side airbag device, the retainer member may include a harness attachment portion for attaching the harness thereto and the second through hole may be provided below the harness attachment portion.

Therefore, the harness can be held so as to extend upward in relation to the second through hole. Accordingly, it is possible to efficiently use a space behind the retainer member.

The side airbag device may include a stay cloth which guides the deployment of the airbag and the first through hole may be provided at a position closer to the seat than a fracture portion to which a front end of the stay cloth is attached.

Therefore, it is possible to prevent the interference of components inside the seat by providing the first through hole on the seat side having an available layout compared to the vehicle body door side.

In the side airbag device, the base member may include a skin pull-in slit which is formed in an area adjacent to the airbag storage portion.

Therefore, it is possible to prevent the interference between the pull-in skin end portion and the harness.

The side airbag device further includes: a stay cloth which guides the deployment of the airbag; and a stay cloth bracket which attaches the stay cloth thereto, in which the stay cloth bracket is attached while being in contact with an inner surface of the airbag storage portion.

Therefore, the stay cloth bracket is attached to the airbag storage portion of the base member. Accordingly, the stay cloth bracket can be disposed so as not to protrude toward the outside of the airbag storage portion. For that reason, it is possible to miniaturize the side airbag device.

In the side airbag device, the airbag storage portion may include a bottom portion and a side wall portion which extends forward from the bottom portion and the stay cloth bracket may be attached while being in contact with the side wall portion of the airbag storage portion.

Therefore, the stay cloth bracket can be attached to the side wall portion of the airbag storage portion. Accordingly, the distance between the stay cloth bracket and the fracture portion is shortened compared to a case in which the stay cloth bracket is attached to the bottom portion of the airbag storage portion. For that reason, it is possible to shorten the stay cloth.

In the side airbag device, the stay cloth bracket may include an attachment portion which is attached to the side wall portion of the airbag storage portion and a first extending portion which extends while being bent from the attachment portion and the first extending portion may include a first stay cloth holding portion which holds a first stay cloth.

In this way, the attachment portion attached to the airbag storage portion and the first extending portion to which the first stay cloth is attached are bent and connected to each other. For that reason, it is possible to prevent the stay cloth bracket from being separated from the base member since the first stay cloth is pulled.

In the side airbag device, the stay cloth bracket may include a convex portion which is formed in the periphery of the first stay cloth holding portion and projects forward.

Therefore, it is possible to prevent the first stay cloth holding portion and the base member from contacting each other. Accordingly, it is possible to prevent the first stay cloth from contacting the base member.

In the side airbag device, the stay cloth bracket may include a second extending portion which extends while being bent from the attachment portion, the second extending portion may include a second stay cloth holding portion which holds a second stay cloth, and the second extending portion may be connected to the attachment portion on the side opposite to the first extending portion and extend to the side opposite to the first extending portion.

Therefore, it is possible to cancel the tensile force between the first stay cloth and the second stay cloth. Accordingly, it is possible to prevent the stay cloth bracket from being separated from the base member.

Advantageous Effects of Invention

According to the present invention, it is possible to dispose the harness so as not to interfere with the airbag.

According to the present invention, it is possible to prevent a decrease in rigidity of the base member.

According to the present invention, it is possible to prevent the harness from contacting the retainer member.

According to the present invention, it is possible to prevent a decrease in rigidity of the airbag storage portion holding the inflator in the base member.

According to the present invention, it is possible to prevent the harness from contacting the boss portion.

According to the present invention, it is easy to position the base member and the retainer member.

According to the present invention, it is possible to improve the rigidity of the area including the first through hole in the base member in the up to down direction.

According to the present invention, it is possible to efficiently use the space behind the retainer member.

According to the present invention, it is possible to prevent the interference of the components inside the seat.

According to the present invention, it is possible to prevent the interference between the pull-in skin end portion and the harness.

According to the present invention, it is possible to miniaturize the side airbag device.

According to the present invention, it is possible to shorten the stay cloth.

According to the present invention, it is possible to prevent the stay cloth bracket from being separated from the base member.

According to the present invention, it is possible to prevent the first stay cloth from contacting the base member.

According to the present invention, it is possible to cancel the tensile force between the first stay cloth and the second stay cloth.

DESCRIPTION OF EMBODIMENTS

Hereinafter, a side airbag device 1 according to an embodiment of the present invention (hereinafter, an embodiment) will be described with reference to FIGS. 1 to 18.

The side airbag device 1 according to the embodiment is provided between a seat S provided behind a driver seat of a vehicle such as an automobile and a vehicle body door D constituting a part of a vehicle body B.

Additionally, the embodiment to be described below is merely an example for facilitating the understanding of the present invention and does not limit the present invention. That is, the shapes, dimensions, and arrangements of the members described below can be changed and improved without departing from the spirit of the present invention and the present invention, of course, includes equivalents thereof.

In the description below, the "front to back direction" means the front to back direction when viewed from the seated occupant of the seat S and is a direction that coincides with the traveling direction of the vehicle.

The "seat width direction" means the lateral width direction of the seat S and coincides with the right and left direction when viewed from the seated occupant of the seat S. Additionally, the outside of the seat width direction is a direction toward the vehicle body door D on the side closer to the side airbag device 1 and the inside of the seat width direction is a direction on the opposite side.

Further, the "up to down direction" means the height direction of the seat S and coincides with the up to down direction when the seat S is viewed from the front side.

<Configuration of Side Airbag Device 1>

Figure 1:
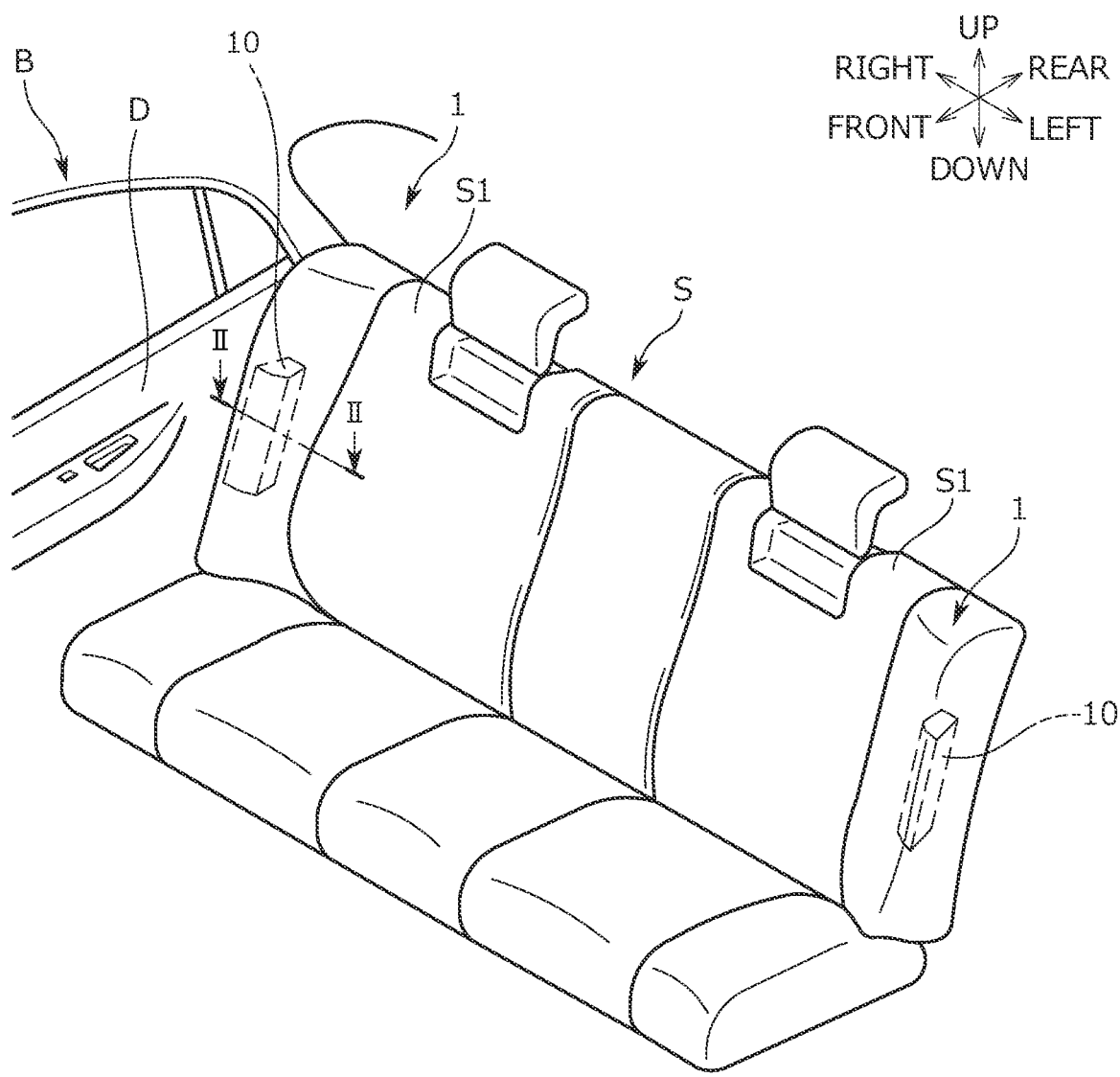
FIG. 1 is an explanatory diagram illustrating an arrangement of a side airbag device of the embodiment.

The side airbag device 1 of the embodiment is a device for alleviating an impact applied from the side of the vehicle body to the seated occupant. As illustrated in FIG. 1, the side airbag device 1 is disposed between a seat back S1 which is a backrest portion of the seat S and the vehicle body door D of the vehicle body B in the vehicle body width direction.

Additionally, in the embodiment, the side airbag device is disposed on each of the right and left outer sides of the seat S in the vehicle body width direction.

Figure 2:
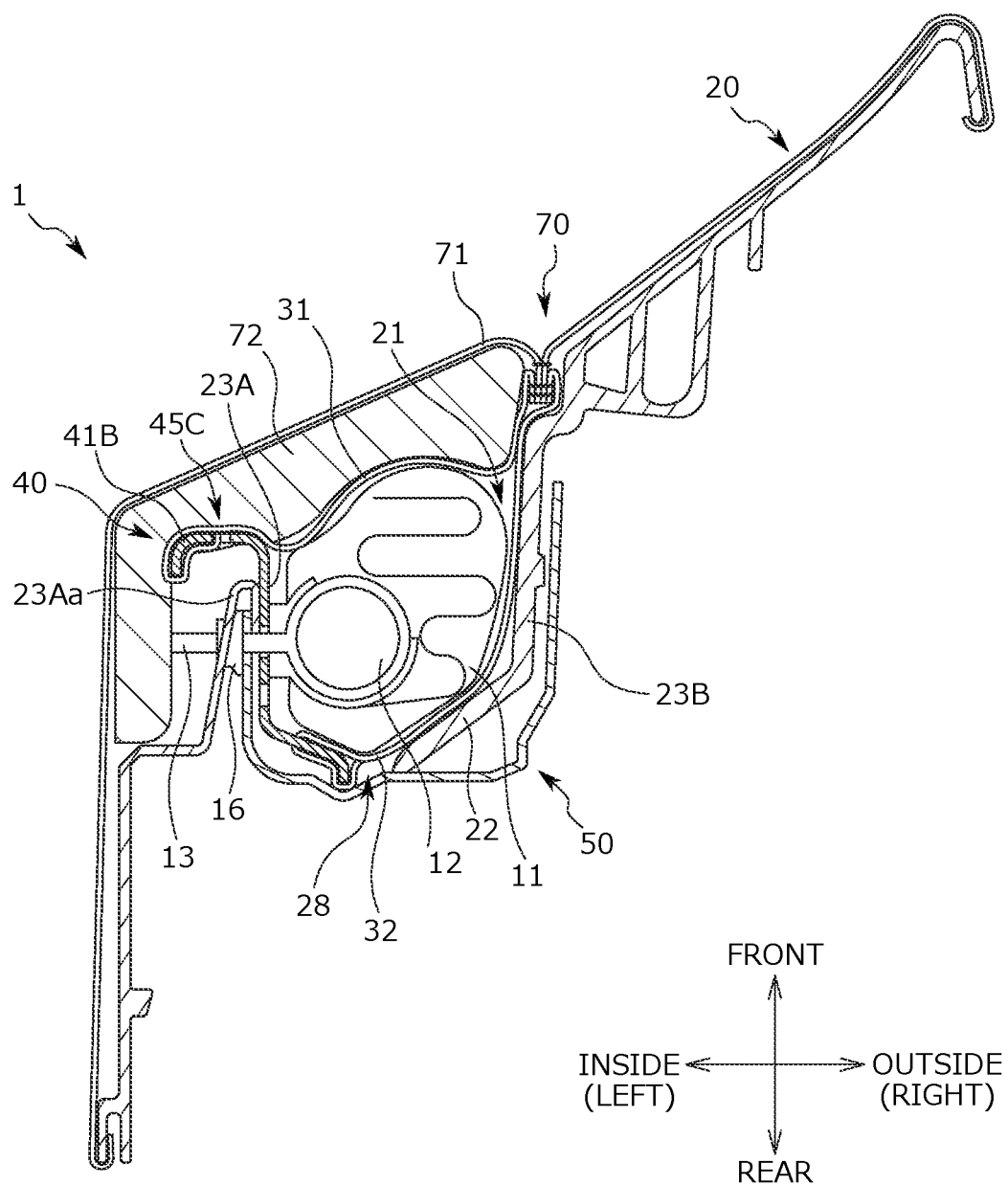
FIG. 2 is a cross-sectional view taken along line II-II of FIG. 1.
Figure 5:
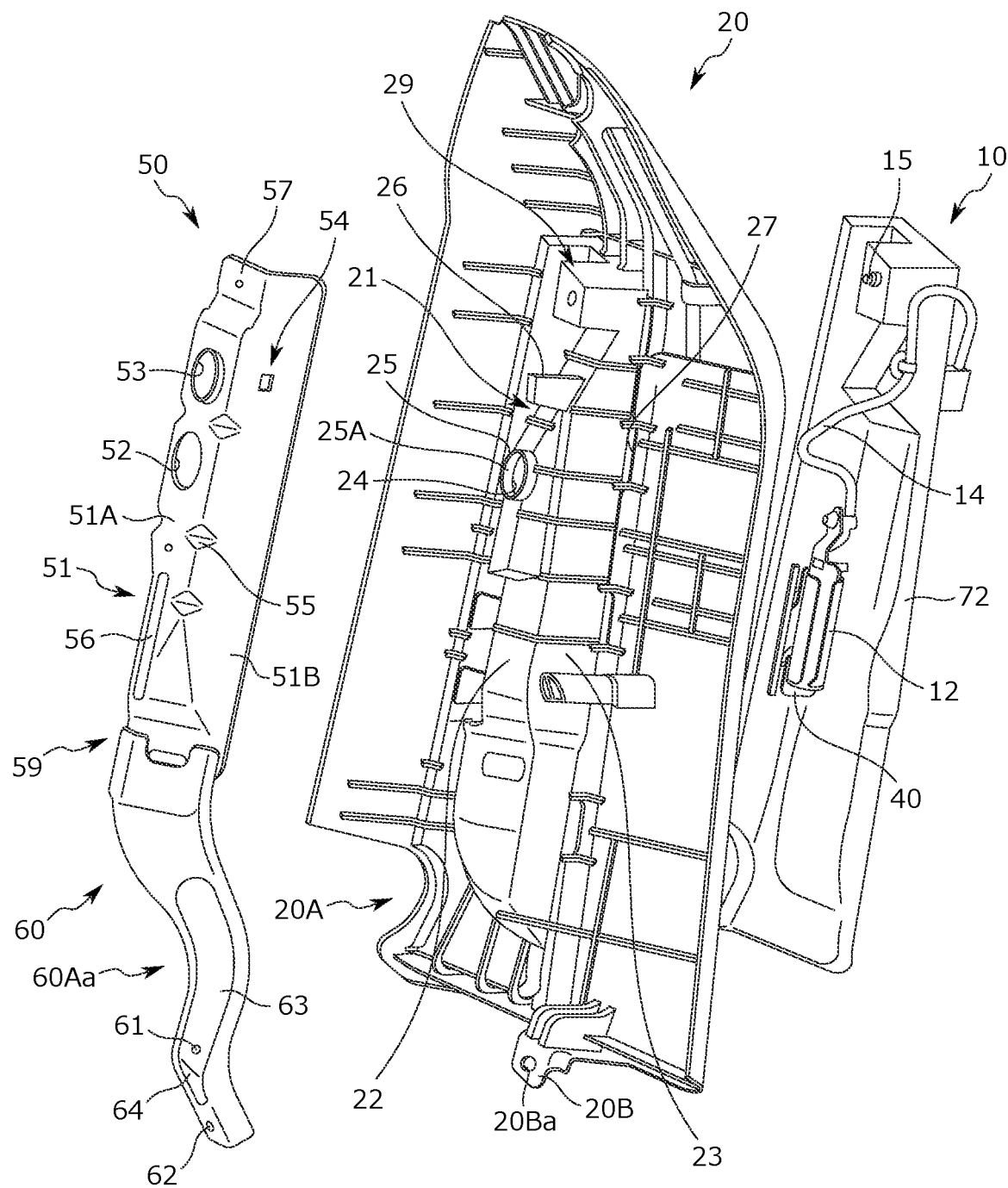
FIG. 5 is an exploded perspective view of the side airbag device.

The side airbag device 1 includes, as illustrated in FIGS. 2 and 5, an airbag module 10, a base member 20, and a retainer member 50 as main components.

Additionally, an airbag 11 of the airbag module 10 is omitted in FIG. 5.

The airbag module 10 includes the airbag 11 which is an inflatable bag body and an inflator 12 which supplies a gas into the airbag 11 as main components.

Figure 7:
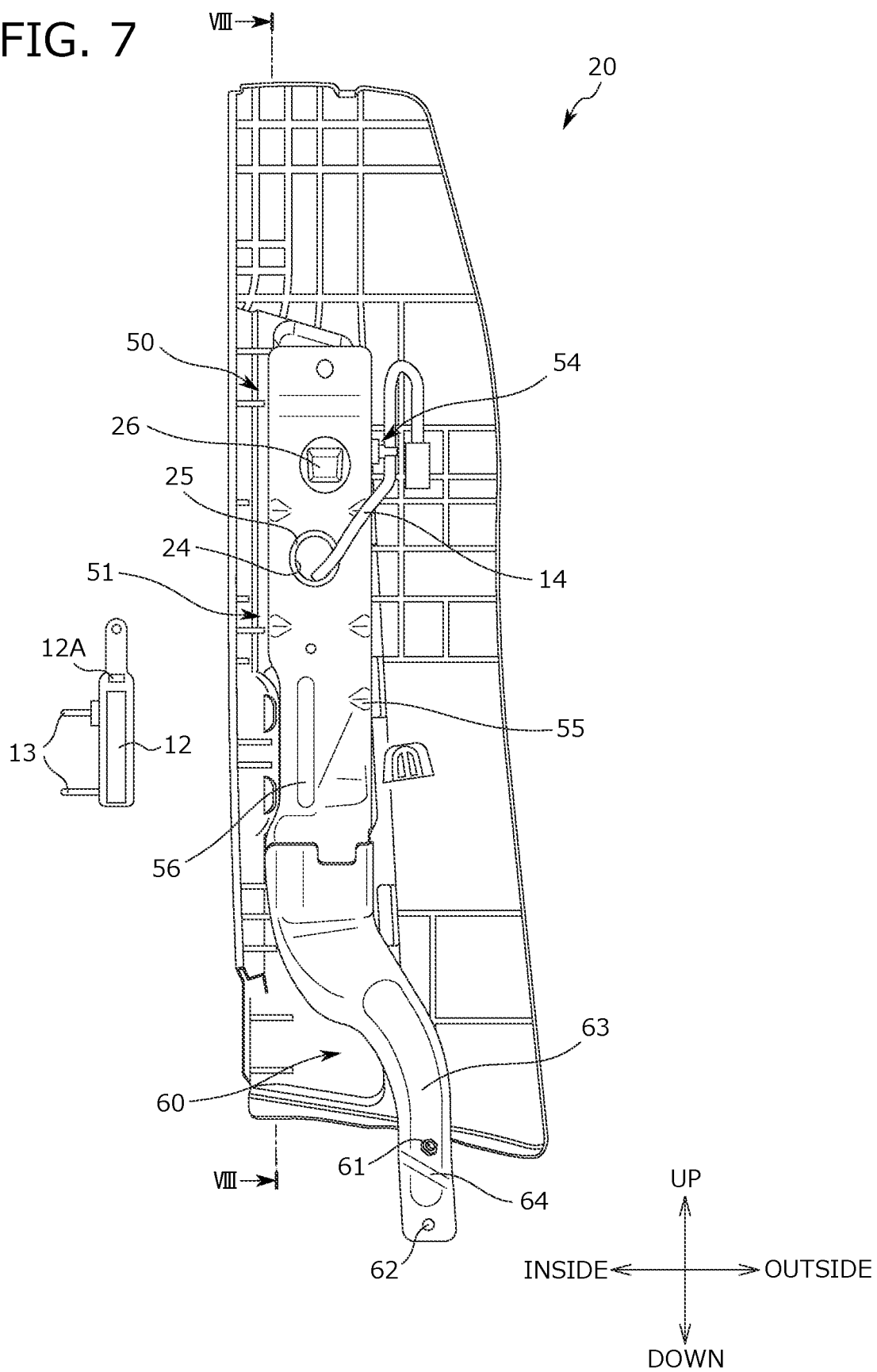
FIG. 7 is a rear view of the side airbag device.

The inflator 12 is, as illustrated in FIGS. 5 and 7, an elongated substantially columnar gas generating device and is disposed so as to be elongated in the up to down direction.

Two bolts 13 are attached to the inflator 12 so as to protrude outward from the inflator 12. Although it will be described in detail later, each of two bolts 13 is fastened to the nut 16 through an opening portion 28 of the base member 20, a bolt insertion hole 49 of a stay cloth bracket 40, and a bolt insertion hole 51Ca of the retainer member 50. Accordingly, the inflator 12, the stay cloth bracket 40, and the retainer member 50 can be fastened to each other.

Additionally, the airbag 11 is folded in a normal state, that is, a non-operation state of the airbag module 10. Then, when an operation signal (igniting electric power) is input to the inflator 12 via a harness 14, the inflator 12 generates a gas and injects a gas into the airbag 11 so as to inflate the airbag 11.

Here, the right and left sides of the airbag 11 in the seat width direction are respectively surrounded by the first stay cloth 31 and the second stay cloth 32. Since the first stay cloth 31 is disposed on the inside of the seat width direction with respect to the airbag 11, the first stay cloth referred to as an inner stay cloth. Further, since the second stay cloth 32 is disposed on the outside of the seat width direction with respect to the airbag 11, the second stay cloth referred to as an outer stay cloth.

The first stay cloth 31 and the second stay cloth 32 are generally referred to as a stay cloth 30 and the stay cloth 30 is a member that guides the deployment direction of the airbag 11 toward a fracture portion 70.

Figure 3:
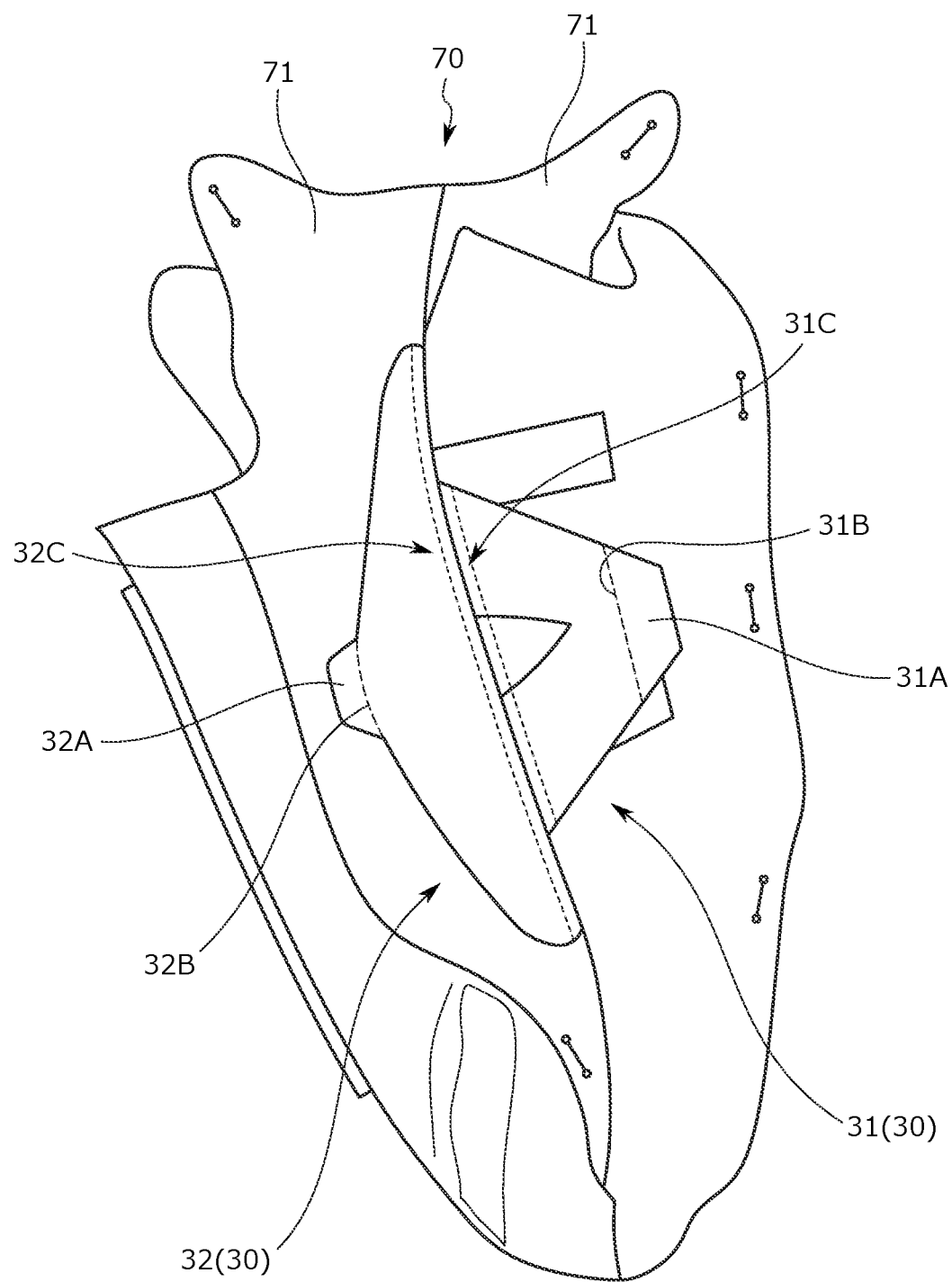
FIG. 3 is a diagram illustrating an attachment structure of a first stay cloth and a second stay cloth with respect to a fracture portion.

As illustrated in FIGS. 2 and 3, the first stay cloth 31 includes a first loop-shaped end portion 31A which is a rear end attached to the stay cloth bracket 40 and a first sewn portion 31C which is a front end attached to the fracture portion 70 which is a tear line. Here, the first loop-shaped end portion 31A of the first stay cloth 31 is an end portion which is formed in a loop shape by sewing two cloth pieces together in a first loop sewn portion 31B.

Similarly, the second stay cloth 32 includes a second loop-shaped end portion 32A which is a rear end attached to the stay cloth bracket 40 and a second sewn portion 32C which is a front end attached to the fracture portion 70 which is a tear line. The second loop-shaped end portion 32A of the second stay cloth 32 is an end portion which is formed in a loop shape by sewing two cloth pieces together in the second loop sewn portion 32B.

Then, the first sewn portion 31C of the first stay cloth 31 and the second sewn portion 32C of the second stay cloth 32 are sewn to the fracture portion 70 provided in a skin material 71 that covers the front surface of the airbag module 10. Specifically, as illustrated in FIG. 2, the fracture portion 70 of the skin material 71 is attached between the first stay cloth 31 and the second stay cloth 32.

When the airbag 11 is inflated and deployed, the first sewn portion 31C of the first stay cloth 31 and the second sewn portion 32C of the second stay cloth 32 are respectively pulled in a separation direction by the airbag 11, the fracture portion 70 is broken, so that the airbag 11 pops out from the fracture portion 70. Therefore, when a certain amount or more of impact is applied to the vehicle, the airbag 11 is deployed from the fracture portion 70 between the seat back S1 and the vehicle body door D, so that an impact applied to an occupant can be alleviated.

Additionally, as illustrated in FIG. 3, the first sewn portion 31C of the first stay cloth 31 and the second sewn portion 32C of the second stay cloth 32 have different lengths in the up to down direction. Specifically, the second sewn portion 32C is longer than the first sewn portion 31C. Therefore, the vicinity of the center of the fracture portion 70 is broken first when deploying the airbag 11 and then the airbag 11 can be inflated and deployed upward from the vicinity of the center. Further, since the airbag 11 is inflated from the vicinity of the center of the fracture portion 70, the scattering amount of a pad 72 which is a seat cushion material can be reduced.

<Configuration of Stay Cloth Bracket 40>

Figure 14:
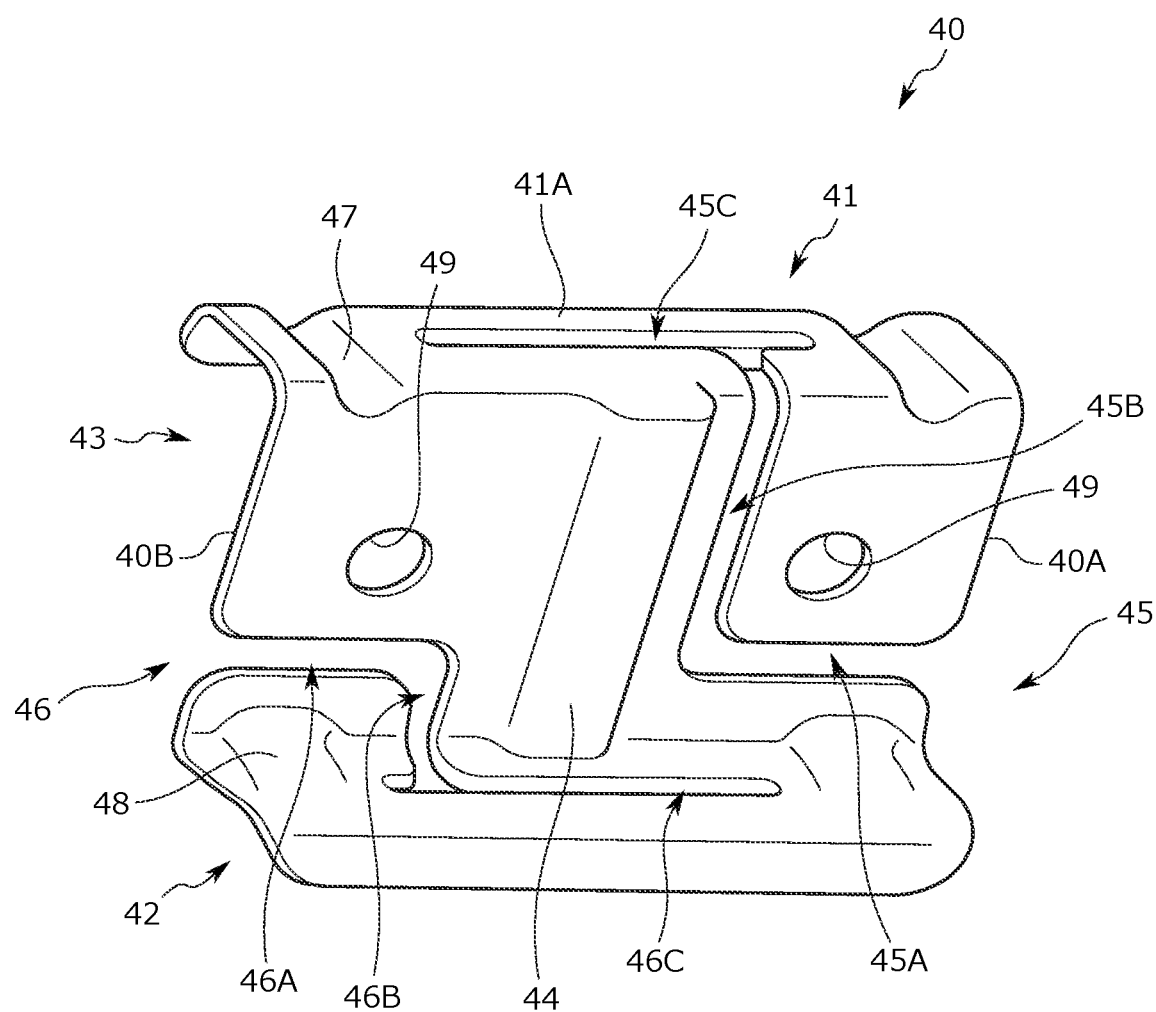
FIG. 14 is a diagram illustrating an overall configuration of a stay cloth bracket.
Figure 15:
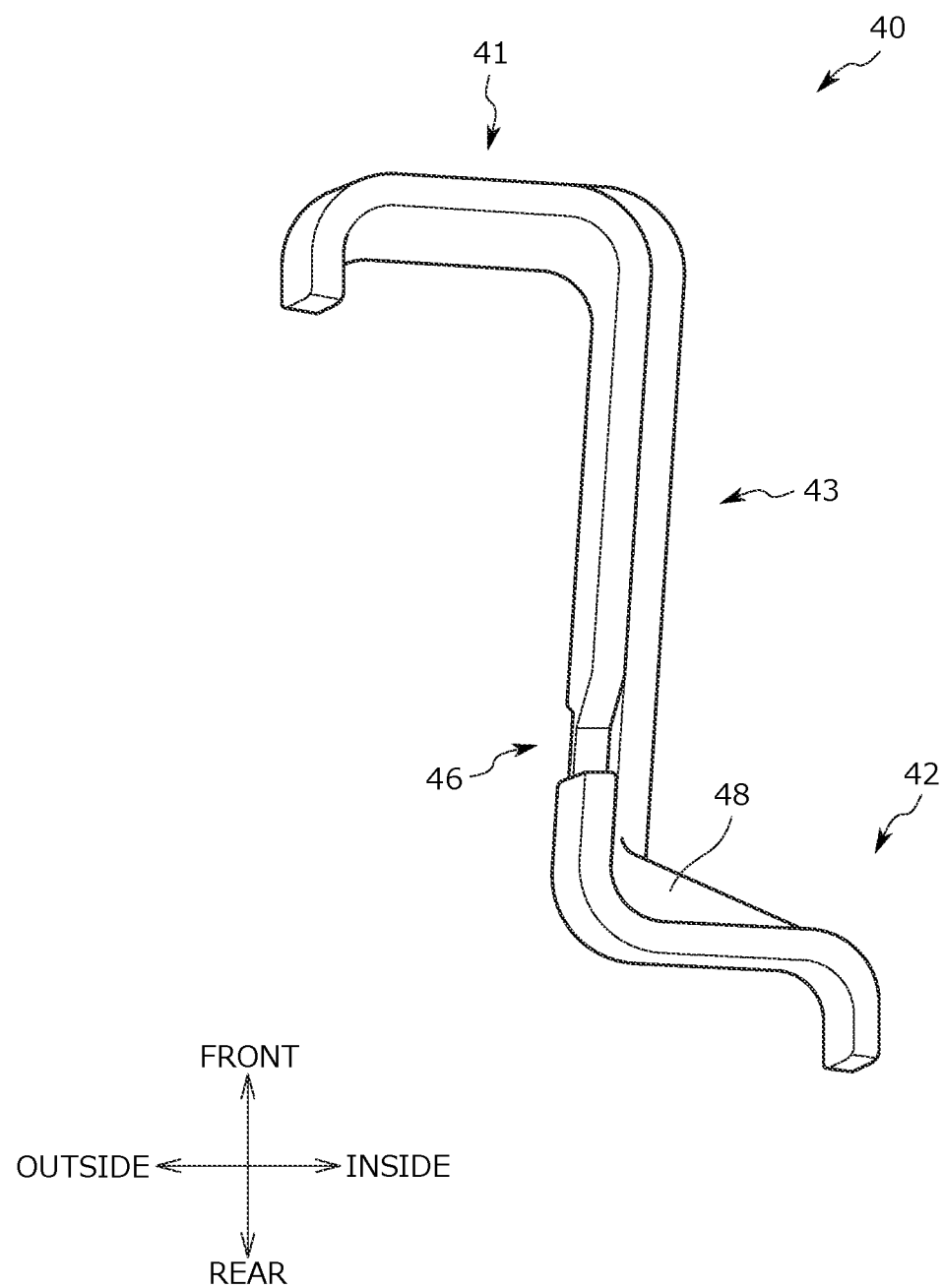
FIG. 15 is a side view of the stay cloth bracket.
Figure 16:
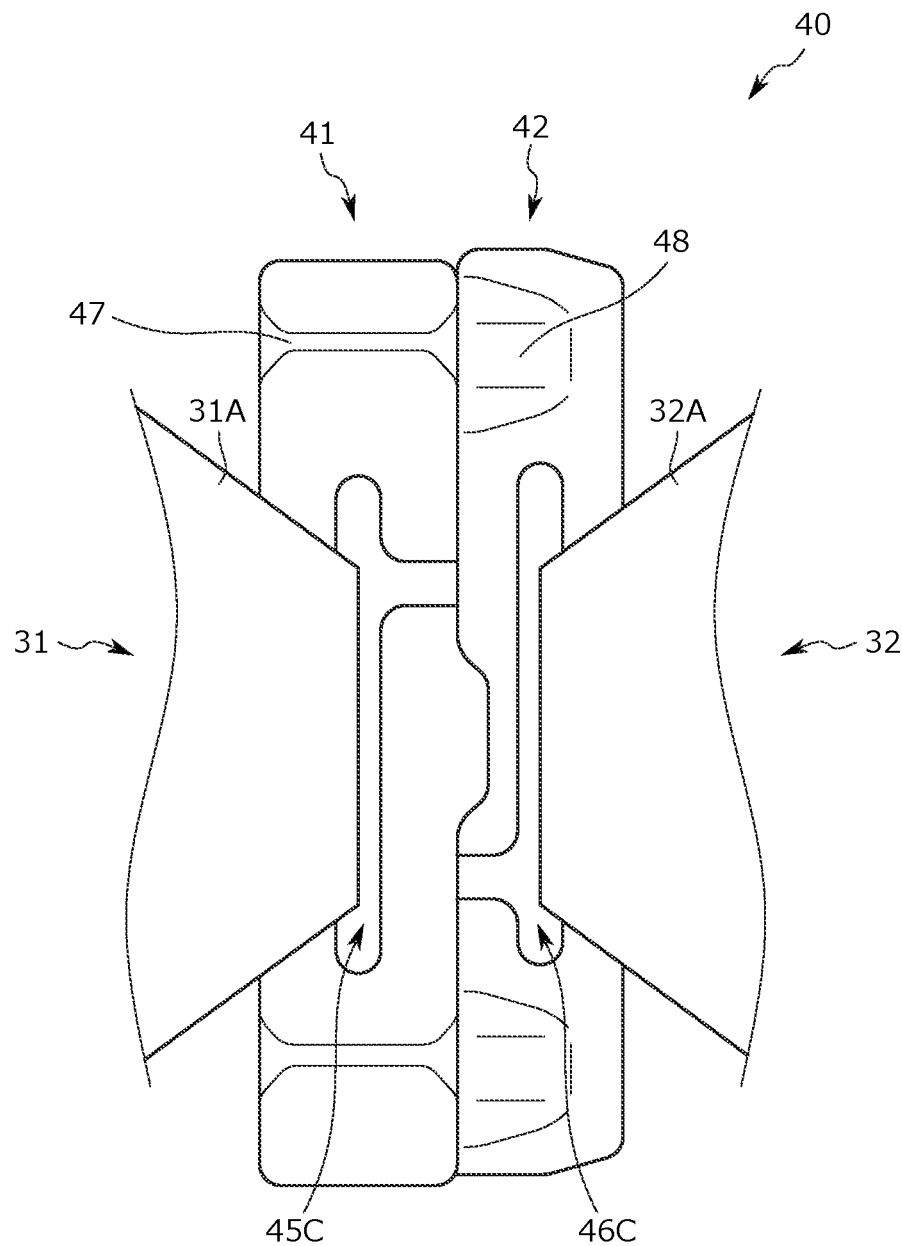
FIG. 16 is a top view of the stay cloth bracket while the first stay cloth and the second stay cloth are attached.

Next, the configuration of the stay cloth bracket 40 that holds the rear end of each of the first stay cloth 31 and the second stay cloth 32 will be described with reference to FIGS. 14 to 16.

The stay cloth bracket 40 is a metal member that includes a first extending portion 41, a second extending portion 42, and an attachment portion 43.

The attachment portion 43 is provided with a bolt insertion hole 49 through which the bolt 13 of the inflator 12 inserted and is fastened to the inflator 12 and the retainer member 50 while the bolt 13 of the inflator 12 is inserted therethrough.

As illustrated in FIG. 2, the attachment portion 43 is disposed in a direction extending in the front to back direction while the stay cloth bracket 40 is attached to the base member and the retainer member 50. In this case, the first extending portion 41 is located at the front side of the attachment portion 43 and the second extending portion 42 is located at the rear side of the attachment portion 43.

That is, the first extending portion 41 is a portion which extends from the front end of the attachment portion 43 outward in the seat width direction. Then, the second extending portion 42 is a portion which extends inward in the seat width direction from the rear end of the attachment portion 43.

A first slit portion 45 is formed in the stay cloth bracket 40 from the attachment portion 43 to the first extending portion 41. Specifically, the first slit portion 45 includes a first opening portion 45A, a first bent portion 45B, and a first stay cloth holding portion 45C.

The first opening portion 45A is a slit area which is formed from a first end portion 40A to a second end portion 40B of the attachment portion 43.

The first bent portion 45B is a slit area which extends from an end opposite to the first end portion 40A in the first opening portion 45A toward the first extending portion 41.

The first stay cloth holding portion 45C is a slit area which is connected to the first bent portion 45B and extends along the longitudinal direction of the first extending portion 41.

Additionally, the first bent portion 45B is connected to the first stay cloth holding portion 45C between both ends of the first stay cloth holding portion 45C in the longitudinal direction.

When attaching the first stay cloth 31 to the stay cloth bracket 40, the first loop-shaped end portion 31A of the first stay cloth 31 is passed through the first stay cloth holding portion 45C through the first opening portion 45A and the first bent portion 45B. Therefore, as illustrated in FIG. 16, the first loop-shaped end portion 31A of the first stay cloth 31 is held by the first stay cloth holding portion 45C.

Additionally, as described above, since the first bent portion 45B is connected between both end portions of the first stay cloth holding portion 45C in the longitudinal direction, the first loop-shaped end portion 31A held by the first stay cloth holding portion 45C is hard to come off from the first stay cloth holding portion 45C.

Then, the bolt 13 of the inflator 12 is passed through the bolt insertion hole 49 of the attachment portion 43 after passing the first loop-shaped end portion 31A of the first stay cloth 31 through the first stay cloth holding portion 45C, so that the stay cloth bracket 40 and the inflator 12 are fixed. Here, since two bolt insertion holes 49 are formed so as to straddle the first bent portion 45B, the first bent portion 45B of the first slit portion 45 can be blocked by the inflator 12 after attaching the inflator 12 to the stay cloth bracket 40. For that reason, it is possible to prevent the first loop-shaped end portion 31A of the first stay cloth 31 from coming off from the stay cloth bracket 40 through the first bent portion 45B.

Further, a convex portion 41A which projects forward is formed in the periphery of the first stay cloth holding portion 45C. Since the convex portion 41A is formed in this way, a void can be formed in front of the first stay cloth holding portion 45C. For that reason, it is possible to prevent the first stay cloth 31 held by the first stay cloth holding portion 45C from being strongly sandwiched between the stay cloth bracket 40 and another member (for example, the airbag 11).

Further, a concave portion 47 is formed on both sides of the first stay cloth holding portion 45C in the first extending portion 41. Since the concave portion 47 is formed in this way, a void can be formed behind the first stay cloth holding portion 45C. For that reason, it is possible to prevent the first stay cloth 31 held by the first stay cloth holding portion 45C from being strongly sandwiched between the stay cloth bracket 40 and another member (for example, a first side wall portion 23A).

Further, a second slit portion 46 is formed in the stay cloth bracket 40 from the attachment portion 43 to the second extending portion 42. Specifically, the second slit portion 46 includes a second opening portion 46A, a second bent portion 46B, and a second stay cloth holding portion 46C.

The second opening portion 46A is a slit area which is formed from the second end portion 40B to the first end portion 40A of the attachment portion 43.

The second bent portion 46B is a slit area which extends from an end opposite to the second end portion 40B in the second opening portion 46A toward the second extending portion 42.

The second stay cloth holding portion 46C is a slit area which is connected to the second bent portion 46B and extends along the longitudinal direction of the second extending portion 42.

Additionally, the second bent portion 46B is connected to the second stay cloth holding portion 46C between both ends of the second stay cloth holding portion 46C in the longitudinal direction.

When attaching the second stay cloth 32 to the stay cloth bracket 40, the second loop-shaped end portion 32A of the second stay cloth 32 is passed through the second stay cloth holding portion 46C through the second opening portion 46A and the second bent portion 46B. Therefore, as illustrated in FIG. 16, the second loop-shaped end portion 32A of the second stay cloth 32 is held by the second stay cloth holding portion 46C.

Additionally, since the second bent portion 46B is connected between both end portions of the second stay cloth holding portion 46C in the longitudinal direction as described above, the second loop-shaped end portion 32A held by the second stay cloth holding portion 46C is hard to come off from the second stay cloth holding portion 46C.

Further, a convex portion 48 is formed on both sides of the second stay cloth holding portion 46C in the second extending portion 42. Since the convex portion 48 is formed in this way, a void can be formed in front of the second stay cloth holding portion 46C. For that reason, it is possible to prevent the second stay cloth 32 held by the second stay cloth holding portion 46C from being strongly sandwiched between the stay cloth bracket 40 and another member (for example, the airbag 11).

Further, a bead portion 44 is formed in the stay cloth bracket 40 over the first extending portion 41, the attachment portion 43, and the second extending portion 42. This bead portion 44 has a shape protruding toward the airbag 11. Since the bead portion 44 is provided in the stay cloth bracket 40 in this way, it is possible to improve the rigidity of the portion pulled in the opposite directions by the first stay cloth 31 and the second stay cloth 32. Accordingly, it is possible to improve the stability of holding the first stay cloth 31 and the second stay cloth 32 using the stay cloth bracket 40.

Figure 6:
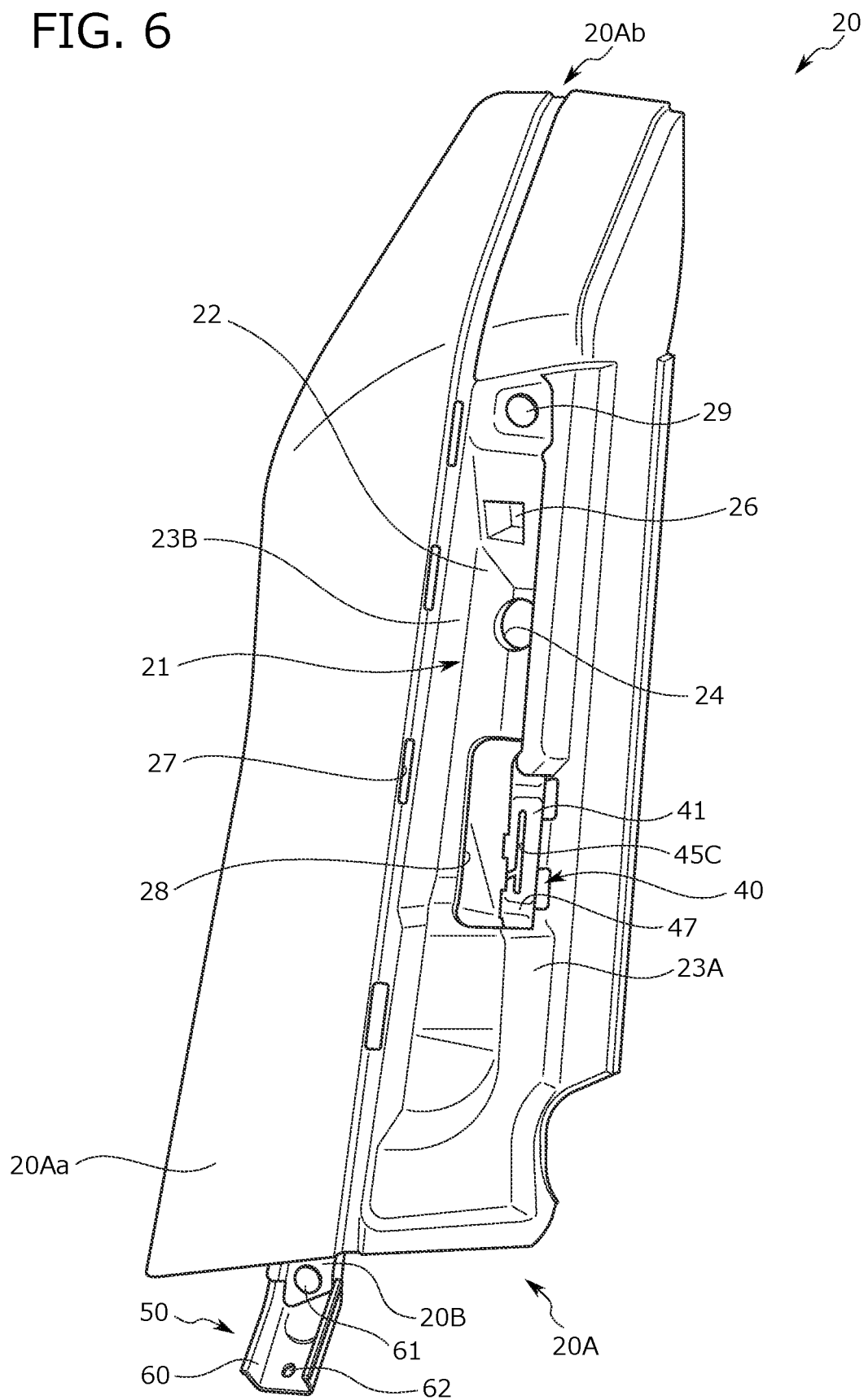
FIG. 6 is a diagram illustrating an attachment state of a base member and a retainer member.
Figure 8:
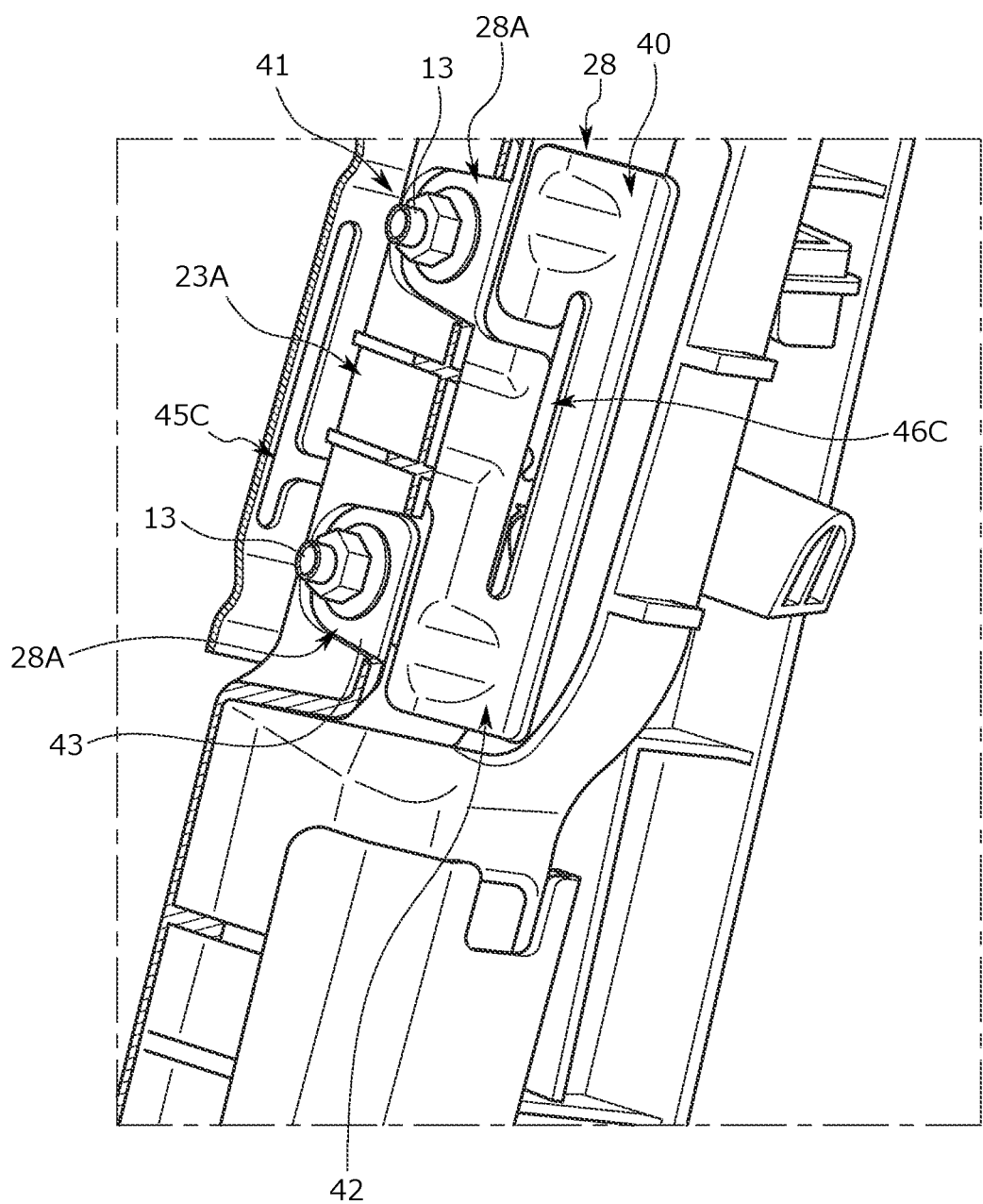
FIG. 8 is a cross-sectional view taken along line VIII-VIII of FIG. 7.
Figure 9:
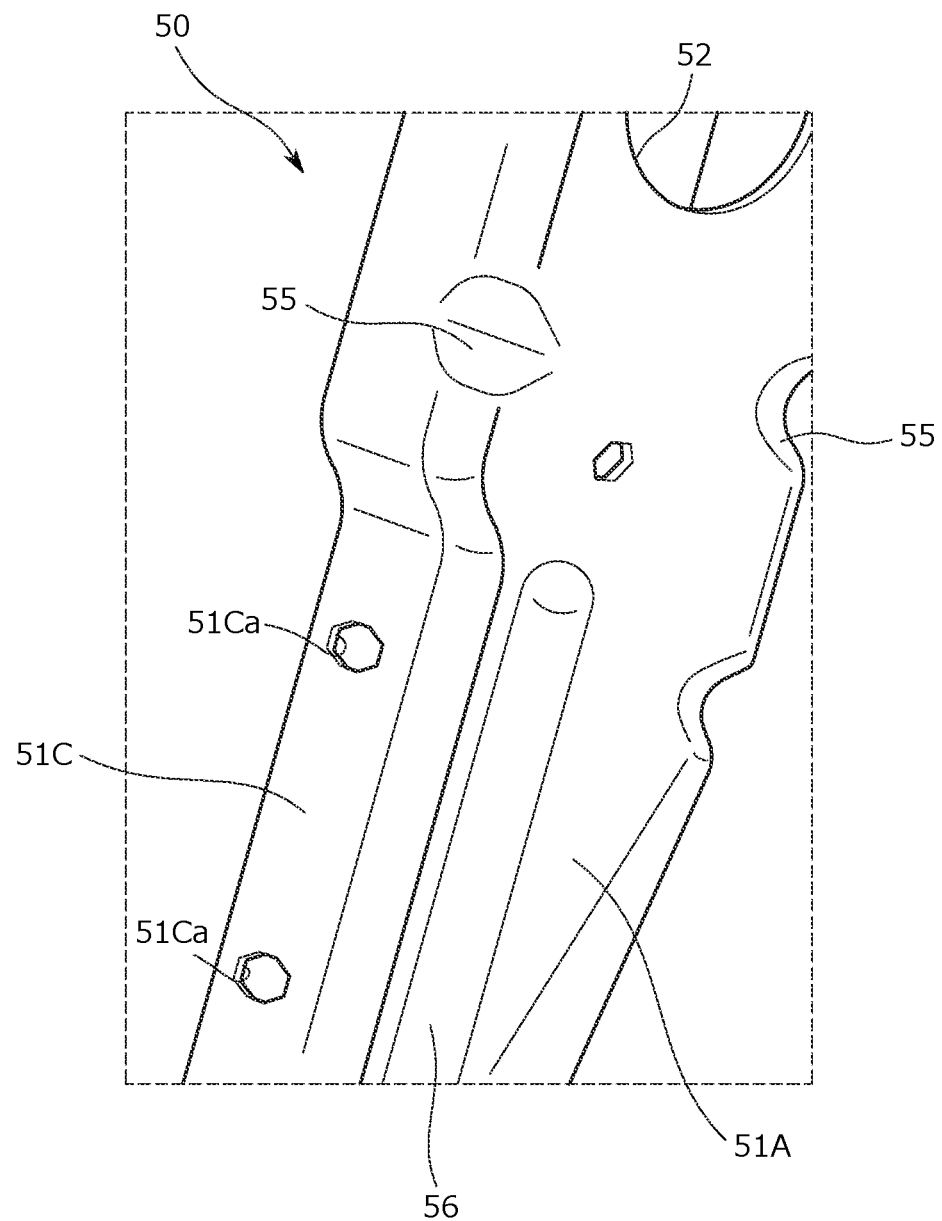
FIG. 9 is a partially enlarged view of the retainer member.

Then, as illustrated in FIGS. 2, 6, and 8, at least a part of the stay cloth bracket 40 is attached while overlapping the opening portion 28 formed in the base member 20.

Specifically, a part of the attachment portion 43 of the stay cloth bracket 40 and the second extending portion 42 are attached while overlapping the opening portion 28.

Further, nylon coating may be applied to the surface of the stay cloth bracket 40. Therefore, a sharp portion of the stay cloth bracket 40 is coated and the abrasion and damage of the first stay cloth 31 and the second stay cloth 32 can be prevented.

<Configuration of Base Member 20>

Next, the configuration of the base member 20 will be described.

The base member 20 is formed of a resinous plate-shaped member to be used as a substrate of the side airbag device 1 and is used to store, as illustrated in FIG. 2, the airbag module 10.

Figure 12:
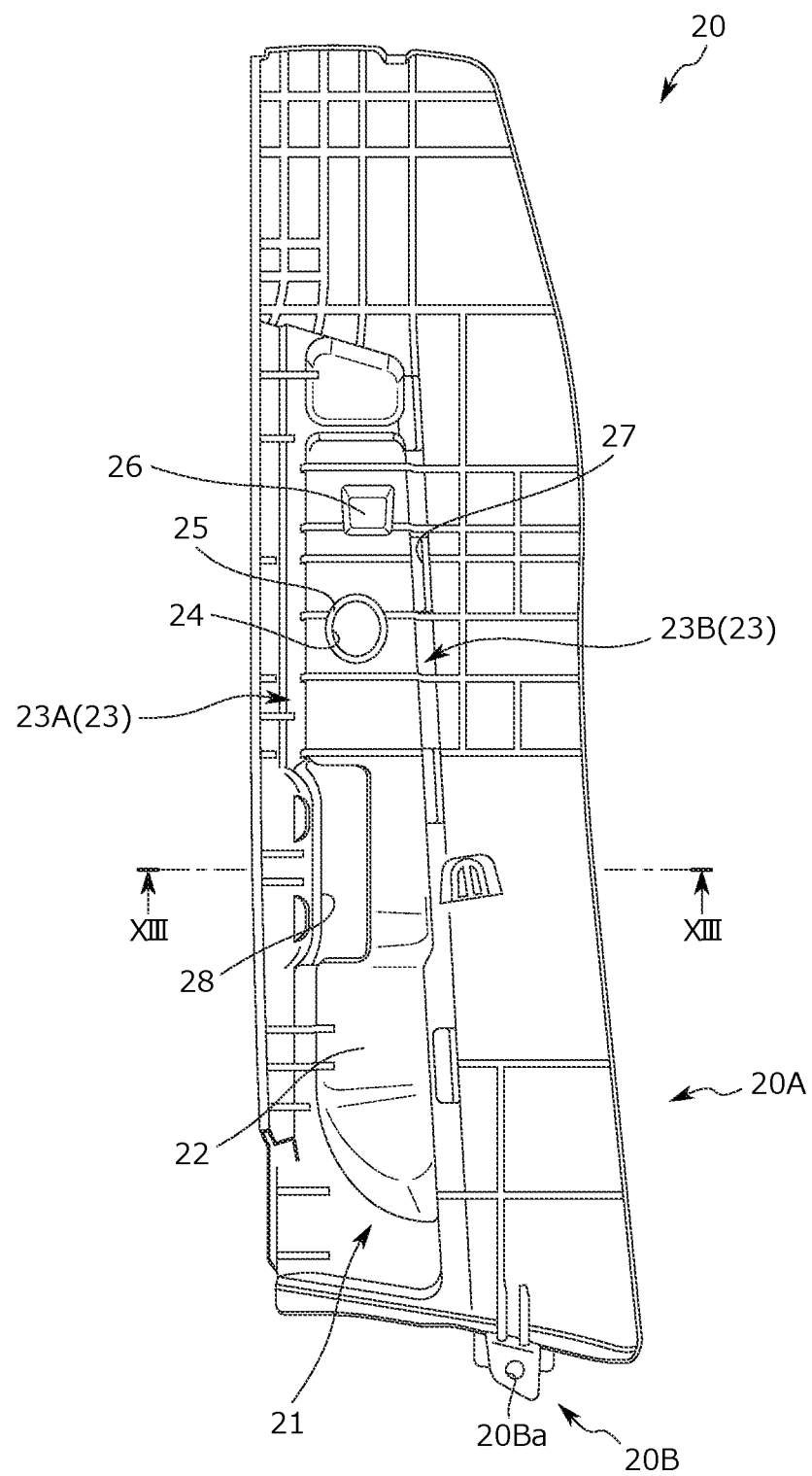
FIG. 12 is a rear view of the base member.
Figure 13:
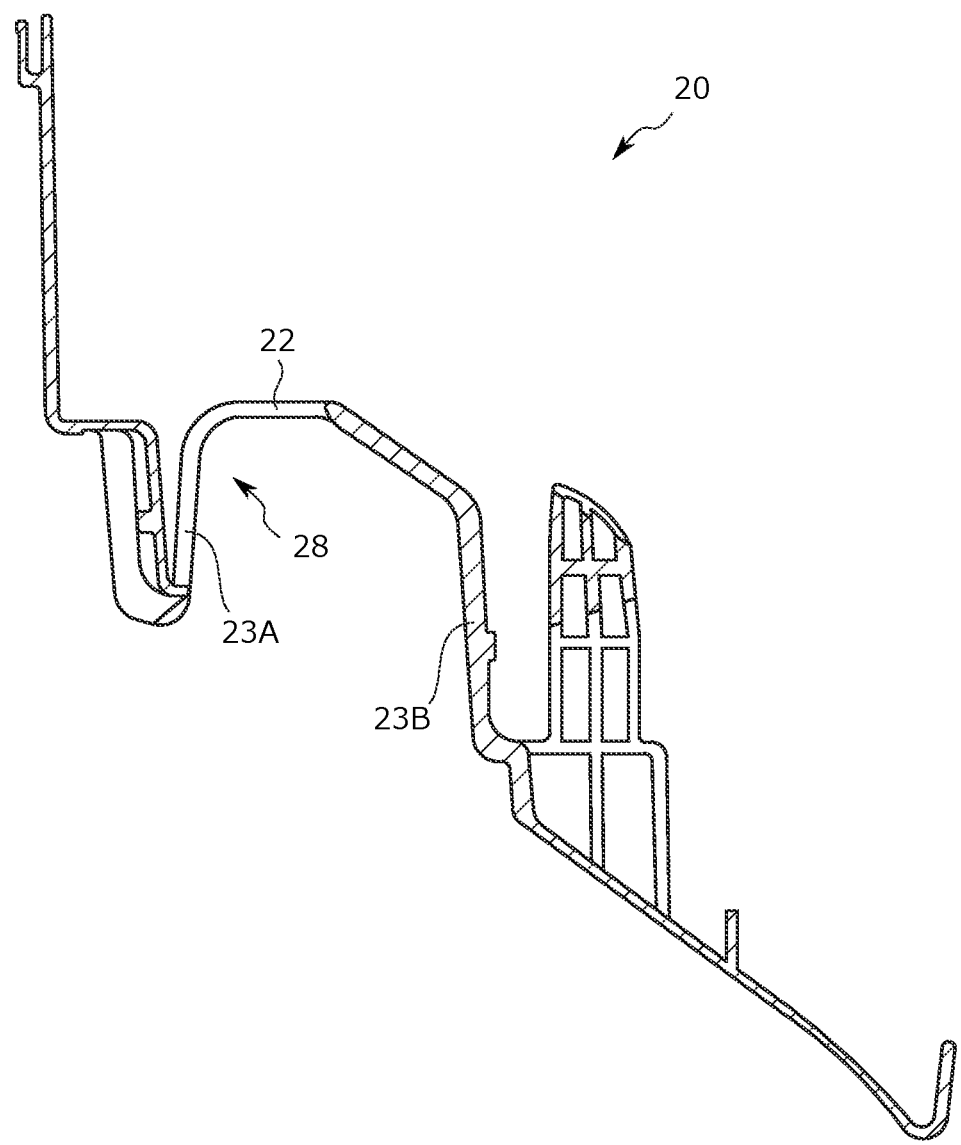
FIG. 13 is a cross-sectional view taken along line XIII-XIII of FIG. 12.

As illustrated in FIG. 12, the base member 20 includes a base member body portion 20A which is provided with an airbag storage portion 21 having a concave shape and storing the airbag module 10, and a lower projecting portion 20B which projects downward from the base member body portion 20A.

The base member body portion 20A includes a front surface portion 20Aa which constitutes the outside of the seat width direction in relation to a pull-in groove 20Ab provided at a substantially center portion of the seat width direction and an airbag storage portion 21 which is provided on the inside of the seat width direction in relation to the pull-in groove 20Ab as main components.

The front surface portion 20Aa is provided at a position continuous to the front surface of the seat back S1 of the seat S. Further, the airbag module 10 is stored in the airbag storage portion 21 and then the pad 72 is provided in front of the airbag module 10. Then, the pad 72 and the front surface portion 20Aa are covered with the skin material 71.

Here, the pull-in groove 20Ab which extends in the up to down direction is formed in a boundary portion between the front surface portion 20Aa and the airbag storage portion 21 as described above. A plurality of skin pull-in slits 27 are formed in this pull-in groove 20Ab at a predetermined interval. In other words, the skin pull-in slit 27 is formed in an area adjacent to the airbag storage portion 21 in the base member 20.

Then, an end portion of the skin material 71 is passed through the skin pull-in slit 27 so that the skin material 71 can be hung and fixed.

Additionally, the end portion of the skin material 71 is passed through the skin pull-in slit 27 and is pulled and fixed toward the side opposite to the airbag storage portion 21 storing the airbag module 10 (that is, from the skin pull-in slit 27 toward the outside of the seat width direction).

Next, the detail of the configuration of the airbag storage portion 21 will be described.

The airbag storage portion 21 is formed as a portion having a substantially U-shaped cross-section and recessed toward the rear side of the seat in relation to the front surface portion 20Aa. Specifically, the airbag storage portion 21 includes a bottom portion 22 which is a wall portion on the rear side of the seat and side wall portions 23 which extend from the right and left sides of the bottom portion 22 toward the front side of the seat.

Additionally, one provided on the inside of the seat width direction in the side wall portions 23 is referred to as a first side wall portion 23A and one provided on the outside of the seat width direction in the side wall portions 23 is referred to as a second side wall portion 23B.

A first through hole 24 is formed in the bottom portion 22. The first through hole 24 is a circular hole and a flange 25 which projects backward is formed in the periphery of the first through hole 24. Specifically, an inner peripheral surface 25A of the flange 25 is continuous to the first through hole 24. Additionally, the flange 25 is inserted through a second through hole 52 of the retainer member 50 to be described later, so that the first through hole 24 of the base member 20 and the second through hole 52 of the retainer member 50 are disposed at a facing position (specifically, an overlapping position).

Figure 4:
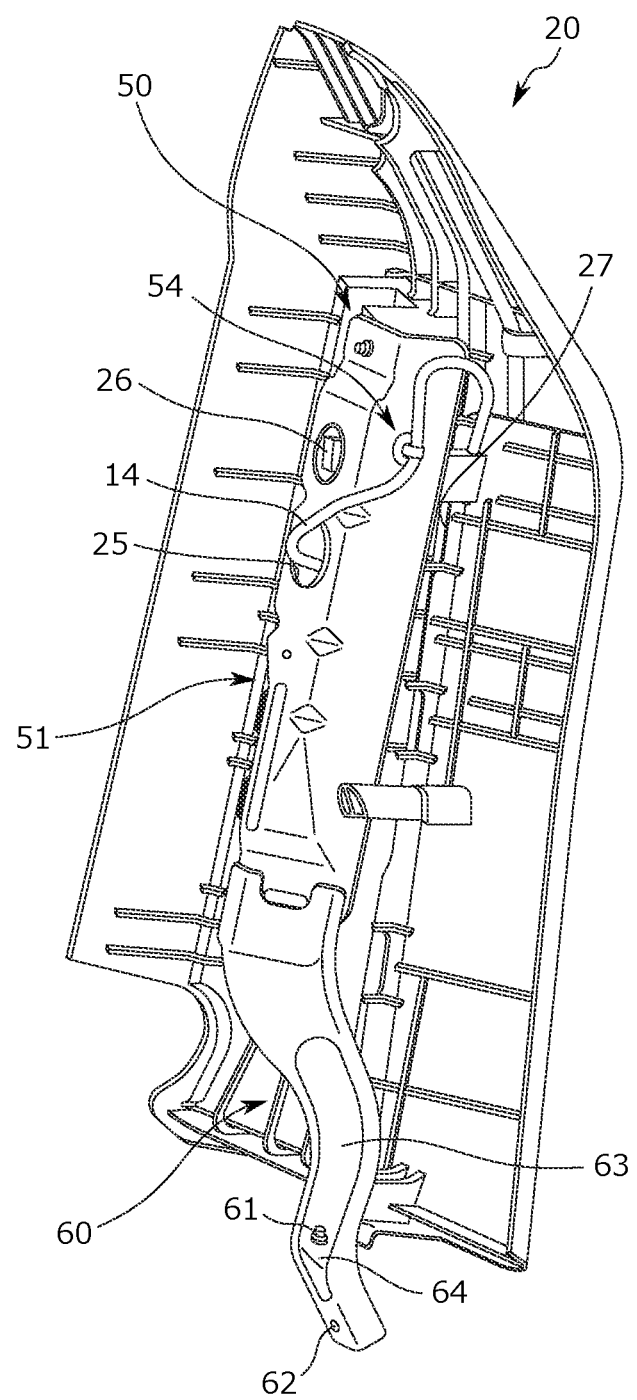
FIG. 4 is a diagram in which the side airbag device is obliquely viewed from a rear side.

The harness 14 which is connected to the inflator 12 is passed through the first through hole 24 and the second through hole 52 as illustrated in FIG. 4. Therefore, the harness 14 of the airbag module 10 disposed in front of the base member can be passed to the rear side of the base member 20 and the retainer member 50 without bypassing the outside of the base member 20.

Here, the position of the first through hole 24 will be described. As illustrated in FIG. 7, the first through hole 24 is provided above the upper end 12A of the inflator 12.

Additionally, in FIG. 7, the inflator 12 is separated from the side airbag device 1 and the inflator 12 is shown so as to correspond to the attachment position in the up to down direction.

Further, the first through hole 24 is provided above the opening portion 28 in the up to down direction.

Further, the first through hole 24 is provided at a position vertically aligned with the boss portion 26 in the up to down direction. Specifically, the first through hole 24 is provided below the boss portion 26.

Further, as illustrated in FIG. 2, the first through hole 24 is provided at a position closer to the seat S than the fracture portion 70 to which the front end of each of the first stay cloth 31 and the second stay cloth 32 is attached in the seat width direction.

Then, in the base member 20, the opening portion 28 is formed from the bottom portion 22 to the first side wall portion 23A. Specifically, the opening portion 28 is formed by stamping a part of the bottom portion 22 and a part of the first side wall portion 23A. When the opening portion 28 which is continuous to the bottom portion 22 and the first side wall portion 23A is formed in this way, the stamping directions are plural compared to a case in which an opening is formed in any one of the bottom portion 22 and the first side wall portion 23A, so that the stamping operation is facilitated.

The opening portion 28 is formed below the first through hole 24 at a position in which at least a part of the opening portion 28 and the first through hole 24 overlap each other in the seat width direction.

Then, at least a part of the stay cloth bracket 40 is disposed in the opening portion 28.

Specifically, as illustrated in FIG. 2, the second extending portion 42 and the attachment portion 43 of the stay cloth bracket 40 are disposed at a position overlapping the opening portion 28.

As illustrated in FIG. 8, the attachment portion 43 of the stay cloth bracket 40 is disposed while being in contact with the first side wall portion 23A which is the inner surface of the airbag storage portion 21. Additionally, an opening upper end 28A of the opening portion 28 is formed with a semi-circular upper edge so that the bolt 13 passes therethrough.

Further, as illustrated in FIG. 2, a side wall front end 23Aa of the front end of the first side wall portion 23A is bent in a U shape. Then, the outer end portion 41B located on the outside of the first extending portion 41 of the stay cloth bracket 40 in the seat width direction is provided so as to surround the side wall front end 23Aa.

Further, a boss portion 26 which projects backward is provided above the first through hole 24 in the airbag storage portion 21. The boss portion 26 is formed in a hollow columnar shape and is passed through a boss portion inserting through hole 53 of the retainer member 50.

Then, a bolt insertion hole 29 through which a bolt 15 provided at the upper end of the airbag module 10 passes is formed above the boss portion 26 in the airbag storage portion 21. Additionally, the bolt insertion hole 29 is provided at a position facing the upper through hole 58 of the retainer member 50. Then, the upper portions of the airbag module 10, the base member 20, and the retainer member 50 are respectively fastened by the bolt 15.

Then, the lower projecting portion 20B is provided below the front surface portion 20Aa. A through hole 20Ba is formed in the lower projecting portion 20B. A bolt is passed through the through hole 20Ba of the base member 20 and a first fastening portion 61 of the retainer member 50 and is fastened so that the base member 20 and the retainer member 50 are fixed.

More specifically, the lower projecting portion 20B of the base member 20 and a retainer attachment portion 60 of the retainer member 50 are fixed.

<Configuration of Retainer Member 50>

Next, the configuration of the retainer member 50 will be described.

The retainer member 50 is a metallic holding member that holds the airbag storage portion 21 of the base member 20 from the rear side of the vehicle body.

Figure 10:
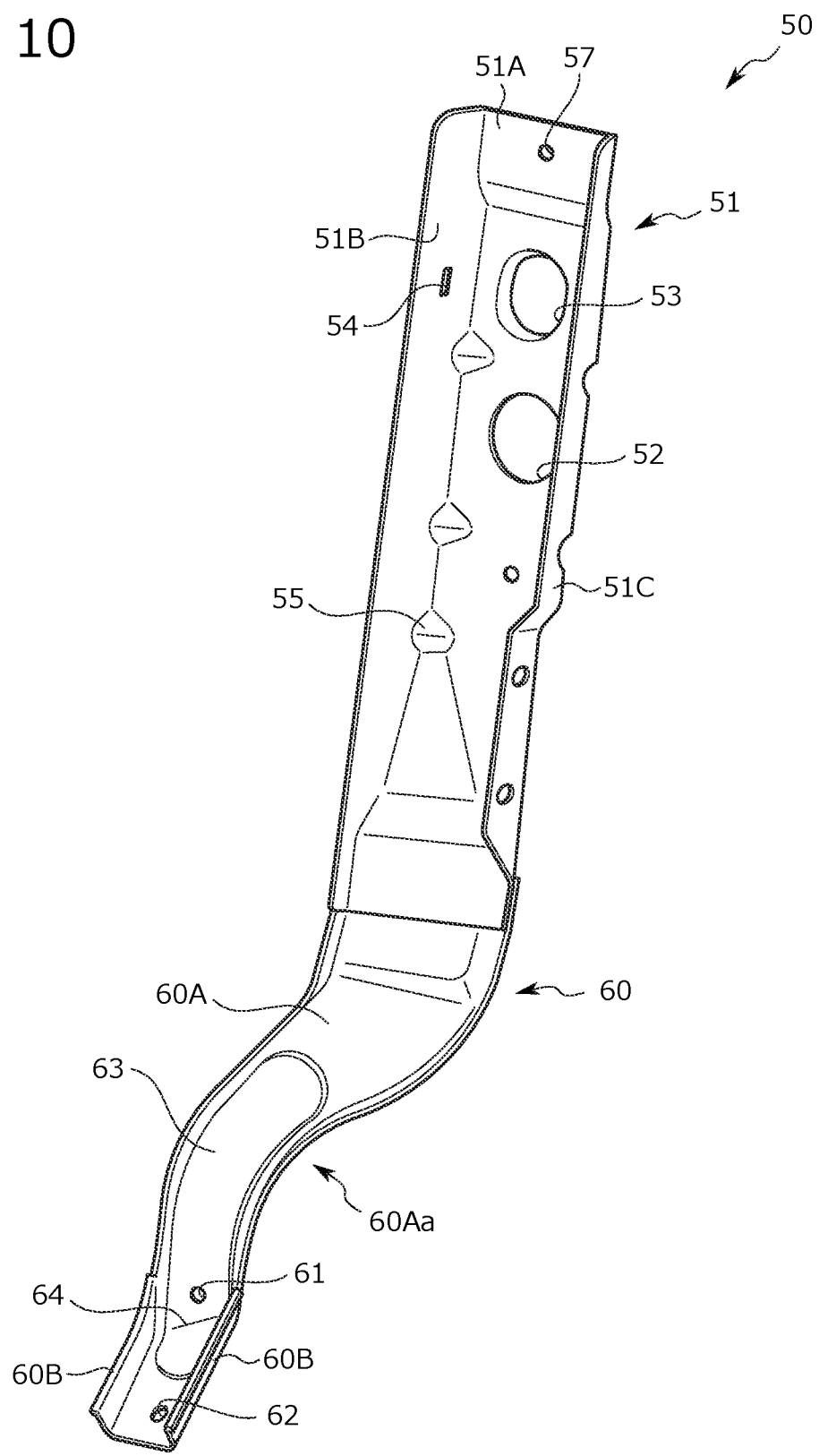
FIG. 10 is a diagram illustrating an overall configuration of the retainer member.

As illustrated in FIGS. 5 and 10, the retainer member 50 includes a retainer body portion 51 which holds the airbag storage portion 21 and a retainer attachment portion 60 which is provided below the retainer body portion 51.

The retainer body portion 51 is formed to have a substantially U-shaped cross-section. Specifically, the retainer body portion 51 includes a retainer rear wall portion 51A which is disposed to face the bottom portion 22 of the airbag storage portion 21 and a first retainer side wall portion 51B and a second retainer side wall portion 51C which extend toward the front side of the seat from both end portions of the retainer rear wall portion 51A in the vehicle body width direction.

A third fastening portion 57, the boss portion inserting through hole 53, the second through hole 52, and a bead portion 56 are formed in the retainer rear wall portion 51A in order from above to below.

The third fastening portion 57 is a hole which is formed at a position facing the bolt insertion hole 29 of the base member 20 and is fastened by using the bolt 15.

The boss portion inserting through hole 53 is a hole through which the boss portion 26 of the base member 20 passes and, as illustrated in FIG. 7, the boss portion inserting through hole 53 is formed to have a size slightly larger than the cross-section of the boss portion 26.

The second through hole 52 is a hole which is formed at a position facing the flange 25 and the first through hole 24 of the base member 20. Then, as illustrated in FIG. 7, the second through hole 52 is formed to have a size slightly larger than the cross-section of the flange 25.

Then, the harness 14 of the airbag module 10 is passed through the second through hole 52 and the first through hole 24 from the front surface side toward the rear surface side of the side airbag device 1.

Additionally, the second through hole 52 and the boss portion inserting through hole 53 are formed at the positions aligned in the up to down direction. In other words, the second through hole 52 and the boss portion inserting through hole 53 are disposed at a position in which at least a part of them overlap each other in the seat width direction.

Further, the bead portion 56 which extends in the up to down direction is formed below the second through hole 52 in the retainer rear wall portion 51A. The bead portion 56 is a portion which is processed so as to project toward the rear side of the seat and, as illustrated in FIG. 7, the bead portion 56 is provided at a position overlapping the inflator 12 attached to the airbag storage portion 21 in the up to down direction.

Then, the first retainer side wall portion 51B of the retainer body portion 51 constitutes an outer side wall of the seat width direction and the second retainer side wall portion 51C constitutes an inner side wall of the seat width direction.

Additionally, as illustrated in FIGS. 5, 7, and 10, a plurality of concave portions 55 which are aligned in the up down direction are formed in a corner portion which connects the retainer rear wall portion 51A and the first retainer side wall portion 51B. The concave portion 55 is a portion which is depressed toward the front side of the seat.

Similarly, the plurality of concave portions 55 are formed in the corner portion which connects the retainer rear wall portion 51A and the second retainer side wall portion 51C.

Since the concave portion 55 is formed in this way, it is possible to prevent the deformation of the first retainer side wall portion 51B and the second retainer side wall portion 51C with respect to the retainer rear wall portion 51A. Accordingly, it is possible to prevent the first retainer side wall portion 51B and the second retainer side wall portion 51C from being widened to the right and left sides with respect to the retainer rear wall portion 51A.

Further, as illustrated in FIGS. 5, 7, and 10, a harness attachment portion 54 which holds a metal fitting attached to the harness 14 is provided in the first retainer side wall portion 51B.

The harness attachment portion 54 may be an opening or one including a metal fitting attached to the opening.

Additionally, the harness attachment portion 54 is provided at a position higher than the second through hole 52 in the up to down direction. Specifically, the harness attachment portion 54 is provided at the substantially same height as that of the boss portion inserting through hole 53 in the up to down direction.

Then, since the harness attachment portion 54 is provided at a position higher than the second through hole 52, the harness 14 passed through the second through hole 52 is held while being bent upward.

The retainer attachment portion 60 which extends downward is provided in the main body lower end portion 59 of the retainer body portion 51. In the embodiment, the retainer attachment portion 60 is bonded to the main body lower end portion 59 by welding, but the present invention is not limited thereto. For example, the retainer body portion 51 and the retainer attachment portion 60 may be bonded to each other using a fastening tool such as a bolt and a nut or the retainer body portion 51 and the retainer attachment portion 60 may be integrally formed with each other.

The retainer attachment portion 60 is a metallic plate-shaped member that extends downward while being curved from the inside toward the outside in the seat width direction.

As illustrated in FIG. 10, the retainer attachment portion 60 includes a main surface portion 60A which forms a surface and side surface portions 60B which are formed by bending both ends of the main surface portion 60A. In other words, the side surface portions 60B are wall portions which erect perpendicularly from both end portions of the main surface portion 60A.

The main surface portion 60A is formed so that a width becomes narrower from above toward below and a circumferential bead portion 63 is provided at a position surrounding the first fastening portion 61 at the substantially center portion of the up to down direction. The circumferential bead portion 63 is formed in a slightly convex shape toward the front side of the seat.

Further, a bent portion 64 is formed in the vicinity of the lower end portion of the retainer attachment portion 60 so as to cross the circumferential bead portion 63. Specifically, the retainer attachment portion 60 is bent toward the front side of the seat in the bent portion 64. The bent portion 64 is formed so as to be inclined downward from the inside to the outside of the seat width direction.

Further, the first fastening portion 61 and the second fastening portion 62 are formed in the vicinity of the lower end portion of the main surface portion 60A. Specifically, the first fastening portion 61 and the second fastening portion 62 are provided below a curved portion 60Aa in which the main surface portion 60A is curved in the seat width direction.

The first fastening portion 61 is a hole which is provided at a position facing the through hole 20Ba of the lower projecting portion 20B of the base member 20. Specifically, a bolt is inserted through the first fastening portion 61 and the through hole 20Ba and is fastened by a nut so that the retainer member 50 (the retainer attachment portion 60) and the base member 20 are fixed.

Additionally, the first fastening portion 61 is formed inside the circumferential bead portion 63 and above the bent portion 64.

Further, the second fastening portion 62 is formed below the circumferential bead portion 63 in the main surface portion 60A.

The second fastening portion 62 is a portion which is fastened to the vehicle body B (for example, a seat frame of the seat S, a tire house, or the like). Specifically, the second fastening portion 62 is a through hole which is formed in the retainer attachment portion 60 and the retainer attachment portion 60 is fastened to the vehicle body B by passing a bolt through the second fastening portion 62 so that the retainer member 50 (the retainer attachment portion 60) is fixed to the vehicle body B.

As described above, all of the first fastening portion 61 and the second fastening portion 62 are provided at separate positions in the vicinity of the lower end portion of the retainer member 50.

Then, since the first fastening portion 61 is provided above the bent portion 64 and the second fastening portion 62 is provided below the bent portion 64, it is possible to perform the fastening operations of the first fastening portion 61 and the second fastening portion 62 at different angles.

Further, since the first fastening portion 61 is formed inside the circumferential bead portion 63, it is possible to increase the attachment rigidity of the retainer member 50 and the base member 20.

Figure 11:
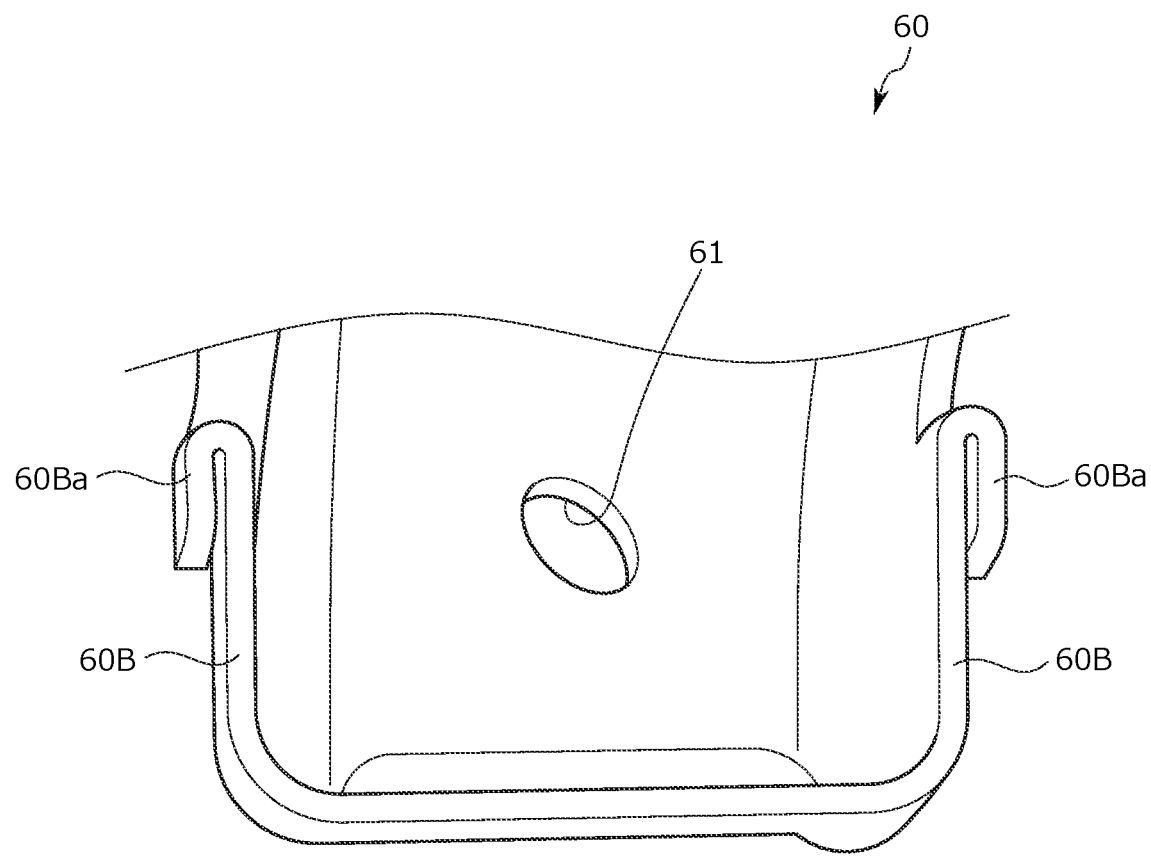
FIG. 11 is a partially enlarged view of the retainer member.

Further, as illustrated in FIG. 11, a folded portion 60Ba is formed at the upper end of the side surface portion 60B at the lower end of the retainer attachment portion 60. The folded portion 60Ba is a portion in which the upper end of the side surface portion 60B is folded back downward, so that the rigidity of the side surface portion 60B is improved. For that reason, it is possible to improve the attachment rigidity of the retainer member 50 and the vehicle body B.

SUMMARY

Major characteristics of the side airbag device 1 according to the above-described embodiments are as follows.

[1] The side airbag device 1 is provided between the vehicle body B and the seat S. The side airbag device 1 includes the airbag module 10 that includes the inflatable airbag 11 and the inflator 12 supplying a gas into the airbag 11, the base member 20 that includes the airbag storage portion 21 having a concave shape and storing the airbag module 10 and is attached between the vehicle body door D and the seat S, the stay cloth 30 which guides the deployment of the airbag 11, and the stay cloth bracket 40 to which the stay cloth 30 is attached. The stay cloth bracket 40 is attached while being in contact with the inner surface of the airbag storage portion 21.

According to the side airbag device 1, the stay cloth bracket 40 is attached to the airbag storage portion 21 of the base member 20. Accordingly, the stay cloth bracket 40 can be disposed outside the airbag storage portion 21 so as not to project. For that reason, it is possible to miniaturize the side airbag device 1.

[2] In the side airbag device 1, the airbag storage portion 21 includes the bottom portion 22 and the side wall portion 23 extending forward from the bottom portion 22 and the stay cloth bracket 40 is attached while being in contact with the side wall portion 23 of the airbag storage portion 21.

Therefore, the stay cloth bracket 40 can be attached to the side wall portion 23 of the airbag storage portion 21. Accordingly, the distance between the stay cloth bracket 40 and the fracture portion 70 is shortened compared to a case in which the stay cloth bracket 40 is attached to the bottom portion 22 of the airbag storage portion 21. For that reason, it is possible to shorten the stay cloth 30.

[3] In the side airbag device 1, the stay cloth bracket 40 includes the attachment portion 43 which is attached to the side wall portion 23 of the airbag storage portion 21 and the first extending portion 41 which extends while being bent from the attachment portion 43. The first extending portion 41 includes the first stay cloth holding portion 45C which holds the first stay cloth 31.

In the side airbag device 1, the attachment portion 43 which is attached to the airbag storage portion 21 and the first extending portion 41 to which the first stay cloth 31 is attached are bent and connected to each other. For that reason, it is possible to prevent the stay cloth bracket 40 from being separated from the base member 20 since the first stay cloth 31 is pulled.

[4] In the side airbag device 1, the stay cloth bracket 40 includes the convex portion 41A which is formed in the periphery of the first stay cloth holding portion 45C and projects forward.

Therefore, it is possible to prevent the first stay cloth holding portion 45C and the base member 20 from contacting each other. Accordingly, it is possible to prevent the first stay cloth 31 from contacting the base member 20.

[5] In the side airbag device 1, the stay cloth bracket 40 includes the second extending portion 42 which extends while being bent from the attachment portion 43. The second extending portion 42 includes the second stay cloth holding portion 46C which holds the second stay cloth 32 and the second extending portion 42 is connected to the attachment portion 43 on the side opposite to the first extending portion 41 and extends to the side opposite to the first extending portion 41.

Therefore, it is possible to cancel the tensile force between the first stay cloth 31 and the second stay cloth 32. Accordingly, it is possible to prevent the stay cloth bracket 40 from being separated from the base member 20.

[6] In the side airbag device 1, the stay cloth bracket 40 includes the bead portion 44 which is formed over the first extending portion 41, the attachment portion 43, and the second extending portion 42.

Therefore, it is possible to improve the rigidity of the first extending portion 41, the attachment portion 43, and the second extending portion 42. Accordingly, it is possible to improve the rigidity of the load receiving portion while suppressing an increase in weight of the stay cloth bracket 40.

[7] In the side airbag device 1, the stay cloth bracket 40 includes the first slit portion 45 which is formed over the first extending portion 41 from the first end portion 40A of the attachment portion 43. A part of the first slit portion 45 becomes the first stay cloth holding portion 45C.

Therefore, it is possible to prevent the first stay cloth 31 from coming off from the first stay cloth holding portion 45C.

[8] In the side airbag device 1, the first extending portion 41 extends from the front end of the attachment portion 43 toward the vehicle body door D, the first stay cloth holding portion 45C is disposed in front of the base member 20, and the first stay cloth 31 extends forward from the first stay cloth holding portion 45C.

Therefore, the distance from the first stay cloth holding portion 45C to the fracture portion 70 is shortened. Accordingly, it is possible to shorten the first stay cloth 31.

[9] In the side airbag device 1, at least a part of the first stay cloth holding portion 45C is disposed on the outside of the seat width direction in relation to the side wall front end 23Aa corresponding to the front end of the side wall portion 23 of the airbag storage portion 21.

Therefore, it is possible to prevent the airbag 11 from contacting the first stay cloth holding portion 45C when deploying the airbag 11. Accordingly, it is possible to improve the deployment stability of the airbag 11.

[10] In the side airbag device 1, the outer end portion 41B on the outside of the seat width direction in the first extending portion 41 is bent so as to surround the side wall front end 23Aa.

Therefore, it is possible to prevent the displacement of the stay cloth bracket 40 when deploying the airbag 11.

Other Embodiments

The present invention is not limited to the above-described embodiments.

Figure 17:
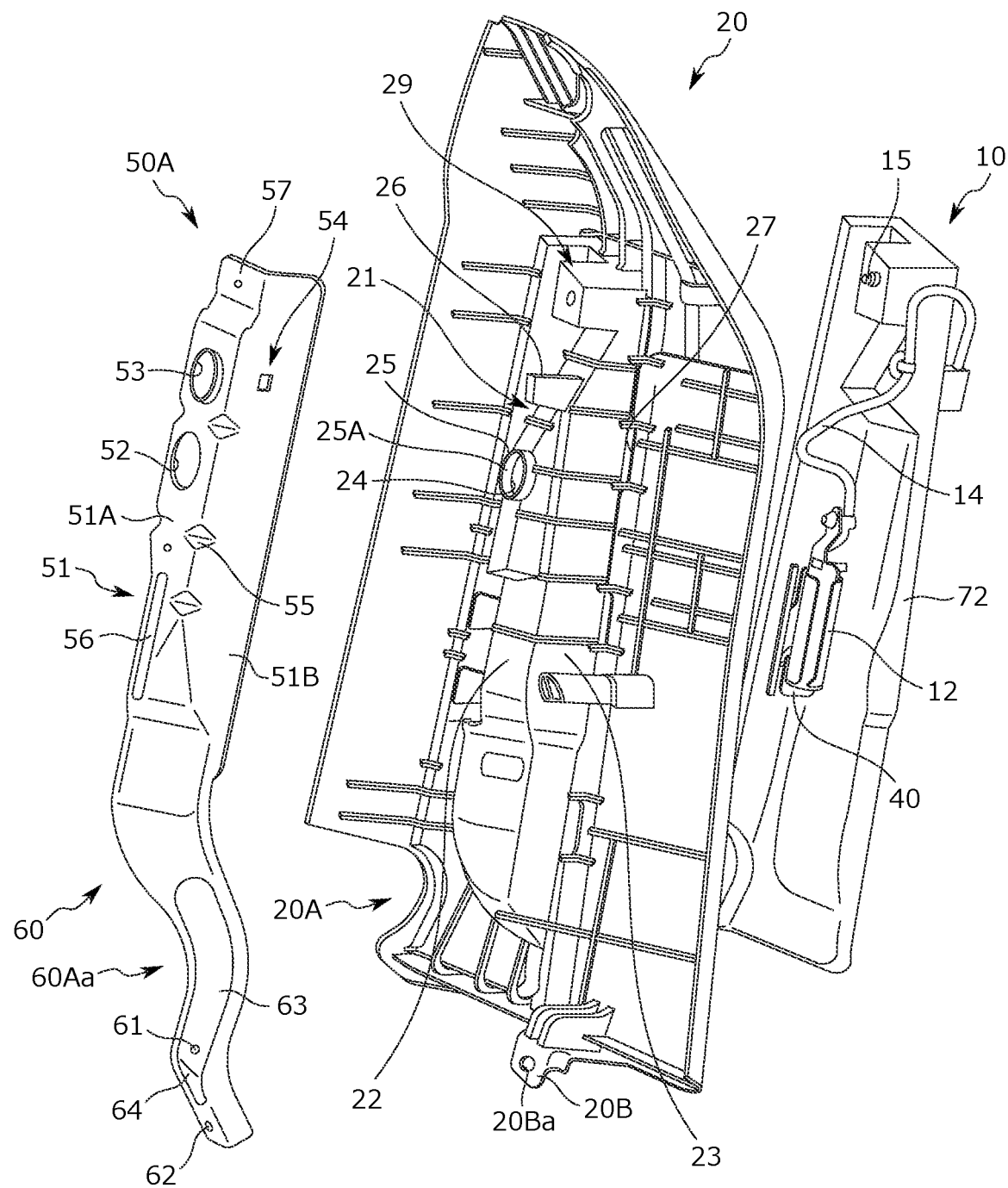
FIG. 17 is an exploded perspective view of a side airbag device according to a modified example.
Figure 18:
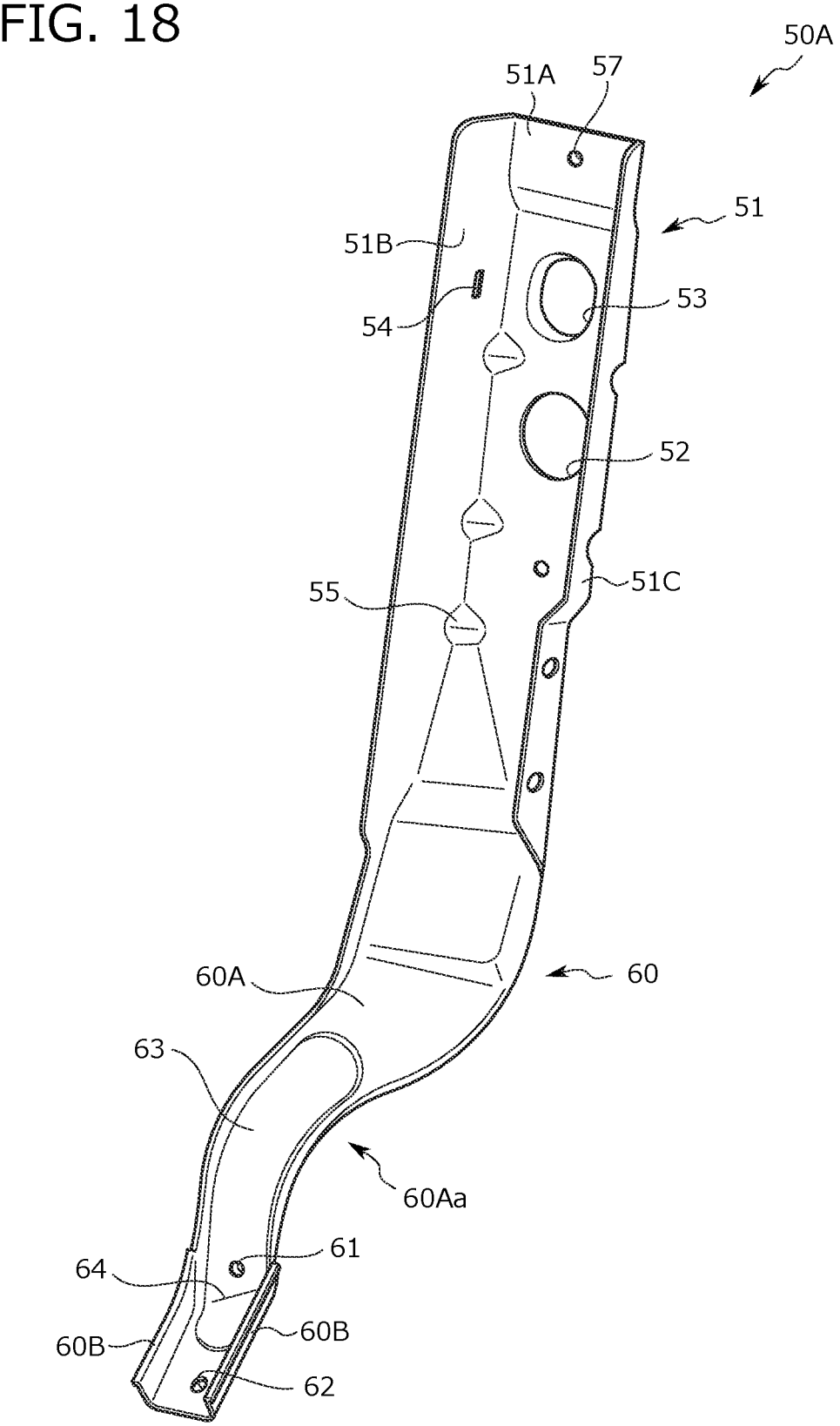
FIG. 18 is a diagram illustrating an overall configuration of a retainer member according to the modified example.

FIGS. 17 and 18 illustrate a retainer member 50A which is a modified example of the retainer member 50. In FIG. 17, the airbag 11 of the airbag module 10 is omitted.

As illustrated in FIG. 17 and FIG. 18, the retainer member 50A is different from the retainer member 50 in that the retainer body portion 51 and the retainer attachment portion 60 are integrally formed with each other and the other points are common.

Additionally, the retainer member 50A may be formed of the same material (for example, metal) at that of the retainer body portion 51 of the retainer member 50.

For example, in the above-described embodiment, an example in which the side airbag device 1 is provided in the rear seat of the vehicle has been described, but the side airbag device 1 may be provided in the front seat or the rear seat from the second row.

Further, the side airbag device 1 is applicable not only to automobiles but also to conveyances such as electronic vehicles, buses, aircrafts, and ships.

REFERENCE SIGNS LIST

B: Vehicle body
: Vehicle body door
S: Seat
  S1: Seat back
1: Side airbag device
10: Airbag module
11: Airbag
12: Inflator
  12A: Upper end
13: Bolt
14: Harness
15: Bolt
16: Nut
20: Base member
  20A: Base member body portion
    20Aa: Front surface portion
    20Ab: Pull-in groove
  20B: Lower projecting portion
    20Ba: Through-hole
21: Airbag storage portion
22: Bottom portion
23: Side wall portion
  23A: First side wall portion
    23Aa: Side wall front end
  23B: Second side wall portion
24: First through hole
25: Flange
  25A: Inner peripheral surface
26: Boss portion
27: Skin pull-in slit
28: Opening portion
  28A: Opening upper end
29: Bolt insertion hole
30: Stay cloth 31: First stay cloth
  31A: First loop-shaped end portion (rear end)
  31B: First loop sewn portion
  31C: First sewn portion (front end)
32: Second stay cloth
  32A: Second loop-shaped end portion (rear end)
  32B: Second loop sewn portion
  32C: Second sewn portion (front end)
40: Stay cloth bracket
  40A: First end portion
  40B: Second end portion
41: First extending portion
  41A: Convex portion
  41B: Outer end portion
42: Second extending portion (extending portion)
43: Attachment portion
44: Bead portion
45: First slit portion
  45A: First opening portion
  45B: First bent portion
  45C: First stay cloth holding portion
46: Second slit portion
  46A: Second opening portion
  46B: Second bent portion
  46C: Second stay cloth holding portion (stay cloth holding portion)
47: Concave portion
48: Convex portion
49: Bolt insertion hole
50: Retainer member
  50A: Retainer member
51: Retainer body portion
  51A: Retainer rear wall portion
  51B: First retainer side wall portion (retainer side wall portion)
  51C: Second retainer side wall portion (retainer side wall portion)
    51Ca: Bolt insertion hole
52: Second through hole
53: Boss portion inserting through hole
54: Harness attachment portion
55: Concave portion
56: Bead portion
57: Third fastening portion
58: Upper through hole
59: Main body lower end portion
60: Retainer attachment portion
  60A: Main surface portion
    60Aa: Curved portion
  60B: Side surface portion
    60Ba: Folded portion
61: First fastening portion
62: Second fastening portion
63: Circumferential bead portion
64: Bent portion
70: Fracture portion
71: Skin material
72: Pad

The invention claimed is:

1. A side airbag device provided between a vehicle body and a seat comprising:
   an airbag module that includes an inflatable airbag and an inflator supplying a gas into the airbag;
   a base member that includes an airbag storage portion having a concave shape and storing the airbag module, and is attached between a vehicle body door and the seat;
   a stay cloth which guides the deployment of the inflatable airbag; and
   a stay cloth bracket which attaches the stay cloth thereto,
   wherein the base member includes an opening portion formed on the base member,
   wherein the stay cloth bracket is attached to the base member, and
   wherein at least a part of the stay cloth bracket overlaps the opening portion.

2. The side airbag device according to claim 1, wherein the stay cloth bracket includes a stay cloth holding portion which holds the stay cloth, and
   the stay cloth holding portion overlaps the opening portion.

3. The side airbag device according to claim 1, wherein the inflator includes a bolt which protrudes outward from the inflator,
   the stay cloth bracket includes a bolt insertion hole through which the bolt is inserted, and
   the stay cloth bracket is fastened to the inflator by inserting the bolt through the bolt insertion hole.

4. The side airbag device according to claim 3, further comprising a retainer member that holds the airbag storage portion from a rear side of the vehicle body, wherein
   the retainer member includes a bolt insertion hole through which the bolt is inserted, and
   the stay cloth bracket and the retainer member are fastened to the bolt of the inflator.

5. The side airbag device according to claim 1, wherein
   the stay cloth bracket includes an attachment portion and an extending portion which extends from the attachment portion, and
   the extending portion includes a stay cloth holding portion which has a slit shape and holds the stay cloth.

6. The side airbag device according to claim 1, further comprising a harness that is connected to the inflator, wherein
   the base member includes a first through hole through which the harness is inserted, and
   the first through hole is disposed at a position different from the opening portion on the base member.

7. The side airbag device according to claim 1, wherein
   the base member includes a bottom portion and a side wall portion which extends forward from the bottom portion, and
   the opening portion is formed from the bottom portion to the side wall portion.

8. A method for manufacturing a side airbag device, wherein the side airbag device includes an airbag module, a base member, a stay cloth which guides the deployment of the airbag module and a stay cloth bracket, the airbag module has an inflatable airbag and an inflator supplying a gas into the inflatable airbag, the base member has an airbag storage portion having a concave shape and an opening portion, the method comprising:
   attaching the base member between a vehicle body door and the seat;
   storing the airbag module in the airbag storage portion of the base member;
   attaching the stay cloth bracket to the base member so that at least a part of the stay cloth bracket overlaps the opening portion; and
   attaching the stay cloth to the stay cloth bracket.

* * * * *